United States Patent
Izuhara et al.

(10) Patent No.: US 9,520,595 B2
(45) Date of Patent: *Dec. 13, 2016

(54) NEGATIVE ELECTRODE FOR LITHIUM-ION SECONDARY CELL AND METHOD FOR MANUFACTURING SAME

(71) Applicants: SANGO Co., Ltd., Miyoshi-shi, Aichi (JP); CITY OF NAGOYA, Nagoya-shi, Aichi (JP)

(72) Inventors: Kouichi Izuhara, Nishikamo-gun (JP); Makoto Daifuku, Nishikamo-gun (JP); Yasushi Miyata, Nagoya (JP)

(73) Assignees: SANGO Co., Ltd., Miyoshi-shi (JP); CITY OF NAGOYA, Nagoya-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/439,063

(22) PCT Filed: Oct. 23, 2013

(86) PCT No.: PCT/JP2013/078737
§ 371 (c)(1),
(2) Date: Apr. 28, 2015

(87) PCT Pub. No.: WO2014/069310
PCT Pub. Date: May 8, 2014

(65) Prior Publication Data
US 2015/0311526 A1    Oct. 29, 2015

(30) Foreign Application Priority Data

Oct. 29, 2012 (JP) .................................. 2012-238289

(51) Int. Cl.
*H01M 4/13* (2010.01)
*H01M 4/587* (2010.01)
(Continued)

(52) U.S. Cl.
CPC .............. *H01M 4/587* (2013.01); *B82Y 30/00* (2013.01); *B82Y 40/00* (2013.01); *C01B 31/0438* (2013.01);
(Continued)

(58) Field of Classification Search
CPC .... H01M 4/587; H01M 4/133; H01M 4/1393; H01M 4/0428; H01M 4/661; H01M 4/366; H01M 10/0525; H01M 2004/027
See application file for complete search history.

(56) References Cited

U.S. PATENT DOCUMENTS

2003/0129305 A1    7/2003   Wu et al.
2004/0126659 A1    7/2004   Graetz et al.
(Continued)

FOREIGN PATENT DOCUMENTS

EP    2 736 105 A1    5/2014
JP    2001-288625 A   10/2001
(Continued)

OTHER PUBLICATIONS

Hiramatsu et al., "Synthesis of Aligned Carbon Nanowalls Using Radio-Frequency Plasma Enhanced Chemical Vapor Deposition", The Japan Society of Plasma Science and Nuclear Fusion Research, vol. 81, No. 9, 2005, pp. 669-673.
(Continued)

*Primary Examiner* — Jane Rhee
(74) *Attorney, Agent, or Firm* — Westerman, Hattori, Daniels & Adrian, LLP

(57) ABSTRACT

A negative electrode for a lithium-ion secondary cell is configured in a novel manner, having a charge-discharge capacity, as determined per unit weight of the carbon used in the electrode, that is markedly higher than the theoretical capacity of graphite, and having a surface that is stabilized against repeated charging and discharging. A negative elec-
(Continued)

trode for a lithium-ion secondary cell in which a carbon layer obtained by building up and growing a graphene sheet is formed on the surface of a substrate comprising an iron-based metal, the carbon layer being formed in a diagonal direction in relation to the substrate, and the carbon layer being used as the surface of the negative electrode. As measured using an argon laser having a wavelength of 532 nm, the Raman spectrum of the graphite that constitutes the carbon nanochip layer has a g/d ratio of 0.30-0.80.

20 Claims, 12 Drawing Sheets

(51) Int. Cl.
| | |
|---|---|
| H01M 4/133 | (2010.01) |
| H01M 4/1393 | (2010.01) |
| C01B 31/04 | (2006.01) |
| B82Y 30/00 | (2011.01) |
| B82Y 40/00 | (2011.01) |
| H01M 4/04 | (2006.01) |
| H01M 4/66 | (2006.01) |
| H01M 10/0525 | (2010.01) |
| H01M 4/36 | (2006.01) |
| H01M 4/02 | (2006.01) |

(52) U.S. Cl.
CPC ........... *H01M 4/0428* (2013.01); *H01M 4/133* (2013.01); *H01M 4/1393* (2013.01); *H01M 4/366* (2013.01); *H01M 4/661* (2013.01); *H01M 10/0525* (2013.01); *H01M 2004/027* (2013.01); *Y02E 60/122* (2013.01); *Y02P 70/54* (2015.11)

(56) References Cited

U.S. PATENT DOCUMENTS

2007/0184190 A1    8/2007    Hiramatsu et al.

2008/0280207 A1    11/2008    Patoux et al.
2011/0311874 A1    12/2011    Zhou et al.

FOREIGN PATENT DOCUMENTS

| JP | 2003-77529 A | 3/2003 |
| JP | 2006-312577 A1 | 11/2006 |
| JP | 2007-194204 A | 8/2007 |
| JP | 2008-63196 A | 3/2008 |
| JP | 2008-239357 A | 10/2008 |
| JP | 2008-263024 A | 10/2008 |
| JP | 2009-521082 A | 5/2009 |
| JP | 2010-9980 A | 1/2010 |
| JP | 2011-103256 A | 5/2011 |
| WO | 2005/021430 A1 | 3/2005 |

OTHER PUBLICATIONS

Yoshimura et al., "Synthesis of New Carbon Nano-Material by Plasma-Enhanced CVD and Structure Evaluation", IHI Technical Report, vol. 48, No. 3, 2008-9, pp. 176-181.

Tachibana, "High-speed charge/discharge characteristics of carbon nanowalls for negative electrode material for lithium-ion secondary cell", Materia Japan, vol. 49, No. 7, 2010, pp. 320-322.

Kasavajjula et al., "Nano- and bulk-silicon-based insertion anodes for lithium-ion secondary cells", Journal of Power Sources, 163, 2007, pp. 1003-1039.

Chen et al., "Hybrid Silicon-Carbon Nanostructured Composites as Superior Anodes for Lithium Ion Batteries", Nano Research, vol. 4, No. 3, 2011, pp. 290-296.

Krivchenko et al., "Carbon nanowalls decorated with silicon for lithium-ion batteries", CARBON 50, 2012, pp. 1438-1442, Available on line, Oct. 29, 2011.

International Search Report dated Jan. 14, 2014 issued in corresponding application No. PCT/JP2013/078737.

Osamu Tanaike et al., "Lithium insertion behaviour of carbon nanowalls by dc plasma CVD and its heat-treatment effect", Elsevier B.V., Solid State Ionics, vol. 180, (2009), pp. 381-385.

Extended (Supplementary) European Search Report dated May 6, 2016, issued in counterpart European Patent Application No. 138509112. (7 pages).

Nano-beam electron diffraction image Point A
Beam diameter: Approximately 5nm φ

Nano-beam electron diffraction image Point B
Beam diameter: Approximately 5nm φ

Selected-area electron diffraction image Point C
Selected-area diameter: Approximately 600nm φ

Camera Constant L · λ= 20.06 Å · mm

NEGATIVE ELECTRODE FOR LITHIUM-ION SECONDARY CELL AND METHOD FOR MANUFACTURING SAME

TECHNICAL FIELD

The present invention relates to a negative electrode for a lithium-ion secondary cell and a method for manufacturing the same.

BACKGROUND ART

In recent years, mobile type electronic apparatuses, such as a mobile phone and a notebook personal computer, have played an important role in the information society. Those electronic apparatuses are required to be driven for a long time, and inevitably, a secondary cell functioning as a drive power source has been desired to have a higher energy density. As power sources for those electronic apparatuses and transport apparatuses, such as a vehicle, a light-weight lithium-ion secondary cell capable of having a high energy density is required to have higher performance.

A lithium-ion secondary cell has the structure in which an electrolytic solution containing a non-aqueous solvent and a lithium salt dissolved therein or a lithium solid electrolyte is provided between a negative electrode active material and a positive electrode active material, and lithium ions are moved back and forth between the negative electrode active material and the positive electrode active material and are intercalated in the active material applied on a collector substrate of a negative electrode, so that charge and discharge can be performed.

As the negative electrode active material for a lithium-ion secondary cell, although amorphous carbon having a relatively low crystallinity was used when a lithium-ion cell was first introduced on the market, in recent years, an artificial graphite material which has a high specific gravity and which is likely to obtain a high energy density has been mainly used. In general, graphite grains or carbon nanotubes, each having a high crystallinity, are mixed with a binder and then applied to a collector substrate Although a carbon nanotube is categorized into a one-dimensional carbon nanostructure which is grown in one direction from a substrate surface by a plasma CVD method or the like, a carbon nanowall has been known which is categorized into a two-dimensional structure grown in a sheet shape on a substrate surface in a direction perpendicular thereto with a graphite layer or an amorphous layer provided therebetween (PTLs 1 to 4 and NPLs 1 and 2). PTL 4 has proposed that in a method for manufacturing carbon nanowalls in which carbon nanowalls are formed on a substrate surface in a plasma atmosphere of hydrogen and a raw material substance containing carbon and fluorine as constituent elements, by addition of oxygen atom radicals or radicals of molecules containing oxygen to the plasma atmosphere, the crystallinity of the carbon nanowall (CNW) is improved.

The carbon nanowall is a crystal which is formed from nano-size graphite crystallites and which has a relatively high completeness. The carbon nanowall is a plate-like nanostructure which is formed of approximately several to one hundred of graphene sheets overlapped with each other and which has a thickness of several to several tens of nanometers. Although a wall height of the carbon nanowall is increased to several hundreds to several thousands of nanometers in proportion to a growth time, the growth of a wall thickness is saturated up to approximately 40 nm.

In the growth of the carbon nanotubes (CNT), although the presence of catalytic metal particles, such as iron or cobalt, on a substrate surface is essential, in the case of the carbon nanowalls, catalytic metal particles are not particularly required. It has been known that by using a plasma CVD apparatus, when a carbon source gas is supplied at a substrate temperature of approximately 400° C. to 500° C. and an in-chamber pressure of approximately 100 Pa or less, the carbon nanowall grows on a substrate selectively in a direction opposite to that in which an active species effective for the grown comes down.

As a negative electrode material to be used for improvement in high-speed charge/discharge characteristics of a lithium-ion secondary cell, it is considered that the carbon nanowall has an ideal structure, and attention has been paid thereto as the negative electrode material (NPL 3 and PTLs 5 and 6). PTL 5 has disclosed that the carbon nanowall is a micrographite having a height of several micrometers and can be obtained by a vapor phase growth method without using catalysts in which a raw material gas is supplied onto a substrate at a temperature of 700° C. to 1,000° C. and a pressure of $0.5 \times 10^{-3}$ to $1.0 \times 10^{-2}$ Torr.

In addition, PTL 6 has disclosed a rapid charge/discharge type thin lithium cell in which flaky carbon nanowalls formed of aggregates of oriented crystallites each having a size of 10 to 30 nm are vapor-phase grown on a collector substrate to stand in a direction perpendicular thereto and are used as the negative electrode without any modification.

However, in a negative electrode using graphite, such as carbon nanowalls, the number of lithium atoms which can be intercalated between graphite layers is one atom per six carbon atoms, and the maximum charge-discharge capacity is limited to 372 mAh/g.

Amorphous hard carbon has also been known as a carbon material of the negative electrode of a lithium-ion secondary cell. However, although having a charge capacity exceeding the theoretical capacity of graphite, the hard carbon has various shortcomings, such as a large irreversible capacity and a small discharge capacity per volume.

Accordingly, silicon theoretically capable of obtaining a charge-discharge capacity exceeding that of a carbon-based negative electrode material, an alloy primarily containing silicon, a silicon oxide, and the like have drawn attention as the negative electrode material. The reason for this is that since silicon can be used as the negative electrode active material by forming an alloy with lithium and can also incorporate a large number of lithium atoms as compared to that of graphite, an increase in capacity of a lithium-ion secondary cell can be expected (for example, see NPL 4 and PTLs 7 to 9).

However, although silicon is a material having a significantly high capacity as compared to that of a carbon material, the volume of alloyed silicon which occludes lithium ions is increased by approximately 4 times that of silicon before occlusion. Hence, a negative electrode using silicon as the negative electrode active material is repeatedly expanded and contracted in synchronism with charge discharge cycles, and as a result, the negative electrode active material is mechanically destroyed. When silicon is used as the negative electrode active material of a lithium-ion secondary cell, in particular, the negative electrode active material is seriously degraded by the charge discharge cycles described above, and when charge and discharge are repeatedly performed several times, the cell capacity is almost lost.

Accordingly, as a method to overcome the shortcoming as described above, there have been developed a negative electrode for a lithium-ion secondary cell in which after a carbon nanostructure layer is formed by applying a slurry of carbon nanofibers or carbon nanotubes to electrically conductive collector foil formed of copper, titanium, nickel, or the like, followed by firing, a silicon layer having a thickness of 100 to 500 nm is further formed on the above carbon nanostructure layer by sputtering to form a composite nanostructure layer containing silicon and carbon (NPL 5 and PTL 10) and a negative electrode for a lithium-ion secondary cell in which a film of nanoscale silicon grains is deposited on surfaces of carbon nanotubes (PTL 11).

Furthermore, a negative electrode material has also been proposed in which a negative electrode active material formed of grains or coating films of silicon or the like is fixed to vertical wall surfaces of graphene sheets of carbon nanowalls formed on a collector substrate, and the change in volume of the negative electrode active material in synchronism with charge discharge cycles is reduced by the spaces between the graphene sheets of the carbon nanowalls so as to increase the capacity (PTL 12 and NPL 6).

CITATION LIST

Patent Literature

PTL 1: US2003/0129305A
PTL 2: Domestic Re-publication of PCT International Publication for Patent Application No. WO2005/021430
PTL 3: Japanese Unexamined Patent Application Publication No. 2006-312577
PTL 4: Japanese Unexamined Patent Application Publication No. 2008-239357
PTL 5: Japanese Unexamined Patent Application Publication No. 2008-063196
PTL 6: Japanese Unexamined Patent Application Publication No. 2010-009980
PTL 7: Japanese Unexamined Patent Application Publication No. 2003-077529
PTL 8: US2004/0126659A
PTL 9: Japanese Unexamined Patent Application Publication No. 2007-194204 (Japanese Patent No. 4671950)
PTL 10: US2011/0311874A
PTL 11: Japanese Unexamined Patent Application Publication (Translation of PCT Application) No. 2009-521082
PTL 12: Japanese Unexamined Patent Application Publication No. 2011-103256

Non-Patent Literature

NPL 1: Mineo Hiramatus et al., "Oriented Growth Of Carbon Nanowalls by RF Plasma CVD", J. Plasma Fusion Res. Vol. 81, No. 9, (2005), 669 to 673
NPL 2: Akihiko Yoshimura et al., "Creation and Structure Evaluation of Novel Carbon Nanomaterial by Plasma CVD", IHI Technical Report, Vol. 48, No. 3, (2008 to 2009), 176 to 181
NPL 3: Masaru Tachibana, "High-speed charge/discharge characteristics of carbon nanowalls for negative electrode material for lithium-ion secondary cell", Materia Japan, Vol. 49, No. 7, 320 to 322 (2010)
NPL 4: Uday Kasavajjula et at., "Nano- and bulk-silicon-based insertion anodes for lithium-ion secondary cells", Journal of Power Sources, 163, (2007), 1003 to 1039
NPL 5: Po-Chiang Chen et al., "Hybrid Silicon-Carbon Nanostructured Composites as Superior Anodes for Lithium Ion Batteries", Nano Research, 4, Num. 3, 290 to 296, (2011)
NPL 6: Victor A. Krivchenko et al., "Carbon nanowalls decorated with silicon for lithium-ion batteries", CARBON, 50, (2012), 1438 to 1442, Available on line, 29 Oct. 2011

SUMMARY OF INVENTION

Technical Problem

As described above, by the use of a related negative electrode using graphite as an active material, the theoretical limit is generated in the charge-discharge capacity. In the rapid charge/discharge type thin lithium cell disclosed in NPL 3 and PTL 6, end surfaces of the carbon nanowalls exposed to an electrolytic solution are each used as an inlet and an outlet of lithium ions, and the discharge capacity is approximately several hundreds of milliampere·hour/g and cannot be further increased.

In addition, in the case in which silicon is used as a negative electrode material of a lithium-ion cell, since the volume is remarkably changed when an alloy is formed between silicon and lithium, the negative electrode material is collapsed by repeatedly performed charge and discharge, and as a result, stable charge/discharge performance cannot be disadvantageously maintained.

The present invention was made to solve the existing problems described above and aims to provide a negative electrode for a lithium-ion secondary cell, the negative electrode having a novel structure in which a carbon used for the negative electrode has a significantly far larger charge-discharge capacity per unit weight than the theoretical capacity of graphite and in which the structure of a negative electrode surface is stable against repeatedly performed charge and discharge; and also aims to provide a lithium-ion secondary cell which uses the negative electrode described above and which has a significantly large charge-discharge capacity.

Solution to Problem

In order to achieve the above object, intensive research on various negative electrodes for lithium-ion secondary cells using carbon materials was carried out by the present inventors. As a result, it was found that when carbon formed of nanosize graphene sheets, such as carbon nanowalls, is used as a carbon material for the negative electrode, and when an iron-based metal material is used as a substrate on which the graphene sheets are grown, a carbon nanostructure having novel configuration and characteristics can be grown. In addition, an unexpected fact was also found that when a lithium-ion secondary cell is formed by using this carbon nanostructure as a negative electrode surface without any modifications, the charge-discharge capacity is significantly increased. As a result, the present invention was completed.

That is, the negative electrode for a lithium-ion secondary cell of the present invention is characterized in that a carbon layer is formed from graphene sheets grown on a surface of an iron-based metal substrate so as to stand in oblique directions with respect to the surface thereof, and the carbon layer is used as a negative electrode surface. In addition, the negative electrode for a lithium-ion secondary cell of the present invention is characterized in that the carbon layer is formed of a carbon nanochips layer of graphene sheets grown slantingly from the surface of the substrate in various directions.

This carbon nanochips layer is one group of nanocarbon structures which are independently and slantingly grown from the surface of the iron-based metal substrate in irregular directions. The coverage of the substrate surface by this carbon nanochips layer is preferably 100%. The "coverage" in this case indicates the rate of the substrate surface covered with carbon nanochips when viewed in a direction perpendicular to the substrate surface, the coverage of the surface substrate which is not covered at all is 0%, and the coverage of the surface substrate which is covered without any spaces between the carbon nanochips is 100%.

The iron-based metal substrate may be either a thin plate or foil formed from any one of pure iron, carbon steel, stainless steel, and an iron alloy. In addition, the iron-based metal substrate may be formed from a material used as a negative electrode collector. In addition, the iron-based metal substrate may be a substrate having an iron-based metal coating layer formed on a surface of a collector substrate.

Unlike a related carbon nanowall which is grown to stand approximately perpendicular to the substrate surface, this carbon nanostructure is grown slantingly in various and oblique directions with respect to the substrate surface so as to cover the substrate surface and has a flaky shape similar to that of a potato chip (hereinafter appropriately referred to as "carbon nanochip", and the aggregate thereof will be referred to as "carbon nanochips").

In a Raman spectrum of graphite of this carbon nanochips layer measured using an argon laser having a wavelength of 532 nm, g/d is in a range of 0.30 to 0.80 (g represents the peak intensity of a g band at approximately 1,600 $cm^{-1}$ caused by in-plane hexagonal lattice vibration of carbon atoms, and d represents the peak intensity of a d band at approximately 1,360 $cm^{-1}$ which indicates a graphite defect).

The negative electrode for a lithium-ion secondary cell of the present invention can be manufactured by a method comprising a step of forming a carbon nanochips layer on a negative electrode substrate by a CVD method using a mixed gas containing hydrogen and methane under the conditions in which a flow rate ratio of $H_2/CH_4$, a substrate temperature, a DC bias voltage, and a growth time are set to 1/5 to 2/1, 650° C. to 850° C., −200 to 0 V, and 15 minutes to 2 hours, respectively, the carbon nanochips layer being formed from graphene sheets independently grown from the negative electrode substrate surface to stand slantingly in various directions, that is, in irregular directions.

In addition, before the above plasma CVD method is performed, an oxygen cleaning step is preferably performed by generating plasma in a chamber in the presence of oxygen. The oxygen cleaning is performed before the substrate is set in the chamber so as to clean the inside thereof together with electrodes or is performed after the substrate is set in the chamber so as to clean the inside thereof together with the substrate surface.

From the Raman spectrum, it is found that as compared to a known carbon nanowall which is grown to stand vertically, the carbon nanochip has a low crystallinity. In addition, an amorphous phase formed at an initial growth stage remains as it was. Incidentally, Raman spectroscopy is an effective method for evaluating carbon materials since sensitively reflecting the structures of various carbon materials. According to Raman spectroscopy, a graphite single crystal shows a single band at 1,581 $cm^{-1}$; as the structure of a carbon material is disordered, a new band at approximately 1,360 $cm^{-1}$ is generated, and the intensity thereof is gradually increased; and next, the band at approximately 1,580 $cm^{-1}$ is shifted to a high frequency side, and the widths of the two bands are gradually increased. It has been reported that according to a typical carbon nanowall, peaks at approximately 1,590 $cm^{-1}$ (g band: peak derived from graphite), approximately 1,350 $cm^{-1}$ (d band: peak caused by a defect or the like), and approximately 1,620 $cm^{-1}$ (d': peak characteristic of CNW which is believed to appear when the crystal size of graphite is small or a large number of edges of graphene sheets are present) are observed (NPL 1).

Since the carbon nanochip has a low crystallinity and many structural defects, such as crystal defects, at voids of graphene networks, spaces between graphene sheets, and front end sides at which carbon nanochips are brought into contact with each other, it is believed that when a thin film layer of carbon nanochips is used as a negative electrode surface for a lithium-ion secondary cell, lithium ions passing through those structural defects are intercalated in each carbon nanochip and/or the spaces between the carbon nanochips and are occluded in the negative electrode at the beginning of charge.

A lithium-ion secondary cell using the negative electrode for a lithium-ion secondary cell of the present invention is assembled such that the carbon nanochips layer is used as a negative electrode surface and is directly brought into contact with an electrolytic solution for a lithium-ion secondary cell. According to the test results obtained by the present inventors, a lithium-ion secondary cell using a carbon having the nanostructure as described above as the negative electrode surface shows a significantly large charge-discharge capacity. In addition, the charge-discharge capacity described above is a capacity surprisingly far larger than the theoretical electrical capacity obtained from the model in which lithium enters between atoms of a carbon crystal by intercalation. Although the reason of this surprisingly high charge-discharge capacity has not been clearly understood, the following is inferred.

That is, according to the present invention, it is believed that since the iron-based metal is used as the substrate on which a carbon having a nanostructure is grown, when graphene sheets are formed by supplying a carbon source gas on the substrate using a vapor phase method, iron which is a substrate component is exposed to the carbon source to generate fine grains of iron, iron oxide, iron carbide, and/or the like, the components of those fine grains are precipitated on the topmost surface of the substrate, and a small amount of the components is incorporated in the graphene sheets. When the iron-based metal is, for example, stainless steel containing Cr, Ni, and/or the like, it is believed that fine grains of those components or oxides thereof are also generated and precipitated on the topmost surface of the substrate, and in addition, a small amount of the components or the like is incorporated in the graphene sheets.

When a lithium-ion secondary cell is charged after the negative electrode thus obtained is assembled therein, since the substances formed of the above metal nano grains, oxide nano grains, and/or carbide nano grains function as a catalyst, lithium ions are allowed to react with an organic electrolyte or an organic electrolytic solution to form an organic compound containing lithium, and this organic compound is precipitated on the graphene sheets. Since the organic compound containing lithium is continuously formed as a thin film having a predetermined thickness on the negative electrode, a large amount of lithium ions is occluded in this thin film, and hence a large charge-discharge capacity is obtained.

That is, although in a negative electrode using related carbon, the upper limit of the charge-discharge capacity is determined by the intercalation amount of lithium ions between atomic layers of crystals of graphite, in the present invention, the charge-discharge capacity is determined by the amount of the organic compound containing lithium, which is continuously formed on a thin film layer of the carbon nanochips of the negative electrode, the upper limit of the charge-discharge capacity determined by the intercalation amount of lithium ions is not present, and hence a large charge-discharge capacity is obtained.

When a lithium-ion secondary cell using the negative electrode of the present invention is charged, a lithium-ion secondary cell in which the organic compound layer containing lithium is formed on the carbon nanochips layer is obtained. In addition, since a mechanism in which the organic compound layer containing lithium is decomposed during discharge works, the structure of the negative electrode surface is stable since being hardly changed by repeatedly performed charge and discharge. In this cell, besides the intercalation, because of the generation of the organic compound containing lithium by a catalytic function, the charge-discharge capacity is not proportional to the amount of the active material of the negative electrode, and hence, significant reduction in size and weight of the cell can be achieved. In addition, as is a related lithium-ion secondary cell, a high potential drive at approximately 3.2 to 4.2 V can also be performed.

Advantageous Effects of Invention

As is the negative electrode for a lithium-ion secondary cell of the present invention, there has not been known a negative electrode having a mechanism in which an organic compound layer containing lithium is formed on a negative electrode surface during charge, and this organic compound layer containing lithium is decomposed during discharge, and in addition, a secondary cell using the negative electrode as described above has also not been known in the past.

In a related intercalation type lithium-ion secondary cell using a charge discharge mechanism in which lithium ions are occluded in and released from an electrode active material, since the material has an intrinsic theoretical limit of the occlusion amount of lithium ions, the charge-discharge capacity per volume or weight of the cell is limited by an active material to be used. On the other hand, in a secondary cell using the negative electrode for a lithium-ion secondary cell of the present invention, as long as the space in which the organic compound layer containing lithium can be continuously formed on the negative electrode surface and a sufficient amount of an electrolytic solution are provided, a surprisingly large charge-discharge capacity can be ensured.

As described above, the negative electrode for a lithium-ion secondary cell of the present invention is driven not only by the occlusion mechanism of lithium ions in the negative electrode active material as that of a related lithium-ion secondary cell but also by the charge-discharge mechanism in which the organic compound layer containing lithium is formed and decomposed on the negative electrode surface, and the chemical reaction at the interface between the carbon covering the entire surface of the negative electrode and the electrolytic solution is used; hence, the volume of the active material of the negative electrode is not influenced by the charge-discharge capacity, and significant reduction in size and weight of the cell can be achieved.

DESCRIPTION OF EMBODIMENTS

Figure 1:
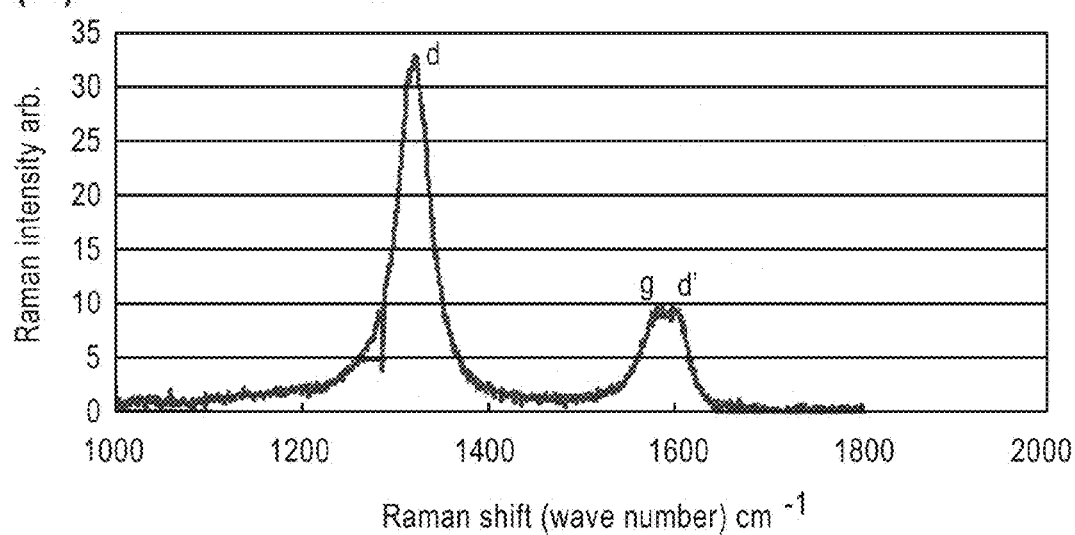
FIG. 1 shows charts of Raman spectra of graphite of carbon nanochips layers grown on SUS304 stainless steel sheets at substrate temperatures of 750° C. (A) and 600° C. (B).
Figure 1:
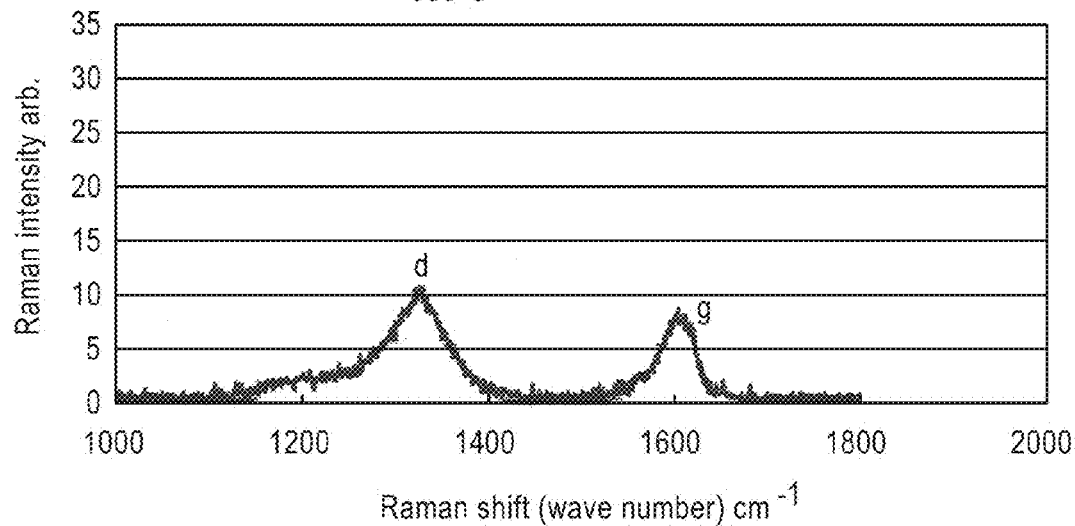

In a negative electrode for a lithium-ion secondary cell of the present invention, a substrate on which a carbon nanochips layer is to be grown is formed of an iron-based metal thin plate or foil. In the present invention, in order to form the carbon nanochips layer, although the substrate is required to have heat resistance since the temperature thereof is set to 650° C. or more, an iron-based metal has a sufficient heat resistance. As the iron-based metal, for example, there may be mentioned pure iron and an alloy material, such as carbon steel, stainless steel, a Fe—Cr alloy, a Fe—Ni alloy, or a Fe—Cr—Ni alloy, containing iron as a primary component.

As the iron-based metal as described above, a known material as a negative electrode collector material may be used. In addition, the iron-based metal substrate may be a substrate having an iron-based metal coating layer formed by a surface treatment method, such as plating or deposition, on a surface of a metal substrate of copper, a copper alloy, nickel, a nickel alloy, iron, an iron alloy, stainless steel, molybdenum, tungsten, or a tantalum, which has been used as a collector. As the stainless steel, for example, austenite stainless steel, such as SUS304, and ferrite stainless steel, such as SUS430, may be mentioned. In addition, as the negative electrode of the present invention, a carbon nanochips layer is formed from many graphene sheets grown slantingly in various direction, that is, grown slantingly in irregular directions, with respect to the surface of the iron-based metal substrate described above.

The carbon nanochips are graphene sheets grown using arbitrary positions of the surface of the iron-based metal substrate as growth nuclei, and the shape of each graphene sheet is a flake similar to that of a potato chip. The front ends at the growth terminal sides are in contact with each other or are very close to each other. As a result, the carbon nanochips layer covers approximately 90% or more of the substrate surface and preferably 100% thereof. In addition, since the root of each carbon nanochip is directly bonded to the substrate surface, excellent electrical conductivity with the collector is obtained. Since having a self-organizing function as is the carbon nanowall, many carbon nanochips are grown at the growth nuclei of the surface of the iron-based metal substrate with intervals of several to several tens of nanometers.

The carbon nanochips layer is grown only to a height of up to approximately 200 nm. Although the reason for this has not been clearly understood, it is believed that in a plasma CVD method, the nuclear formation at the front end of the growth is inhibited by plasma. Although CNW is grown to a height of several micrometers, the height of the carbon nanochips layer is at most approximately 200 nm. The height (thickness) of the carbon nanochips layer is an average height obtained by observation of the cross section of the thin film layer using an electron microscope. The thickness of the graphene sheet of the carbon nanochips is approximately several to several hundreds of nanometers, preferably approximately 5 to 100 nm, and more preferably approximately 5 to 50 nm.

Since showing a different Raman spectrum from that of the carbon nanowall, the carbon nanochips can be discriminated therefrom. That is, in a Raman spectrum of the graphene sheet forming the carbon nanochips layer which is measured using an argon laser at a wavelength of 532 nm, g/d is in a range of 0.30 to 0.80 (g represents the peak intensity of a g band at approximately 1,600 $cm^{-1}$ caused by the in-plane hexagonal lattice vibration of carbon atoms, and d represents the peak intensity of a d band at approximately 1,360 $cm^{-1}$ which indicates a graphite defect). Furthermore, g/d is more preferably in a range of 0.40 to 0.70.

As shown in the charts of Raman spectra of FIG. 1, the g/d ratio of the graphite grown on the substrate by a plasma CVD method is changed by the substrate temperature. In FIG. 1, in the chart of the Raman spectrum of a sample (FIG. 1A) grown at a substrate temperature of 750° C., the peak of a d' band at a shoulder of the g band of approximately 1,630 $cm^{-1}$, which is characteristic of graphite forming carbon nanowalls, is also clearly observed even in the graphite forming carbon nanochips at the same level as that of the g band. However, in a sample (FIG. 1B) grown at a substrate temperature of 600° C., the d' band is not observed, and the carbon nanochips are not grown. That is, according to the present invention, the graphene sheets forming the carbon nanochips are not grown in a direction perpendicular to the substrate surface, and for example, since the g/d ratio of the graphite is smaller than the g/d ratio of graphite of a typical nanowall, the graphene sheets of the present invention can be clearly discriminated therefrom.

Incidentally, as disclosed in PTLs 1 and 9 and NPLs 2 and 6, as for the characteristics and the structure of the carbon nanowall (CNW) itself, the carbon nanowall has a wall structure which independently stands approximately perpendicular to the surface of the substrate and which has a thickness of several to several tens of nanometers and a width and a height of several micrometers. The CNW is formed of approximately several to one hundred of graphene sheets laminated to each other and has a flat plate shape so that the surfaces of the graphene sheets are arranged to be parallel to the surface of the CNW, and at the upper end portion of the flat plate, the end surfaces of the graphene sheets are exposed. Since the growth origin of the CNW is bonded to the substrate surface, the CNW is preferably electrically connected to the collector.

The Raman spectrum of the graphite of CNW shows a peak of a g band at approximately 1,600 $cm^{-1}$ caused by the in-plane hexagonal lattice vibration of carbon atoms and a peak of a d band at approximately 1,360 $cm^{-1}$ which indicates a graphite defect, and a d' peak observed at approximately 1,630 $cm^{-1}$ is a peak characteristic of CNW observed when many edges of graphenes are present. As the intensity of the d peak is increased, the amount of impurities is increased. The intensity ratio g/d of the g peak to the d peak is used as an index showing the degree of graphite properties. In addition, in CNW, g/d relates to the wall size, and as g/d is decreased, the wall size is decreased.

When stainless steel is used as the substrate, any one of austenite, martensite, and ferrite stainless steel may be used. For example, there may be used any types of stainless steel, such as austenite stainless steel (such as SUS304, SUS304-L, SUS302, SUS301, SUS310S, SUS321, SUS316, or SUS316-L), ferrite stainless steel (such as SUS430 or SUS434), martensite stainless steel (such as SUS410S or SUS420J 2), and precipitation hardened stainless steel (such as SUS631 or ASL-350), defined by JIS G4305: 2005 "Cold-rolled stainless steel plate, sheet and strip".

The thickness of the substrate is not particularly limited, and although a thickness of approximately 1 mm or less may be used without any problems, a foil material having a thickness of approximately 5 to 100 micrometers which has been used as a collector is more preferable, and a foil material having a thickness of 5 to 20 micrometers is more preferable from a practical point of view.

Figure 2:
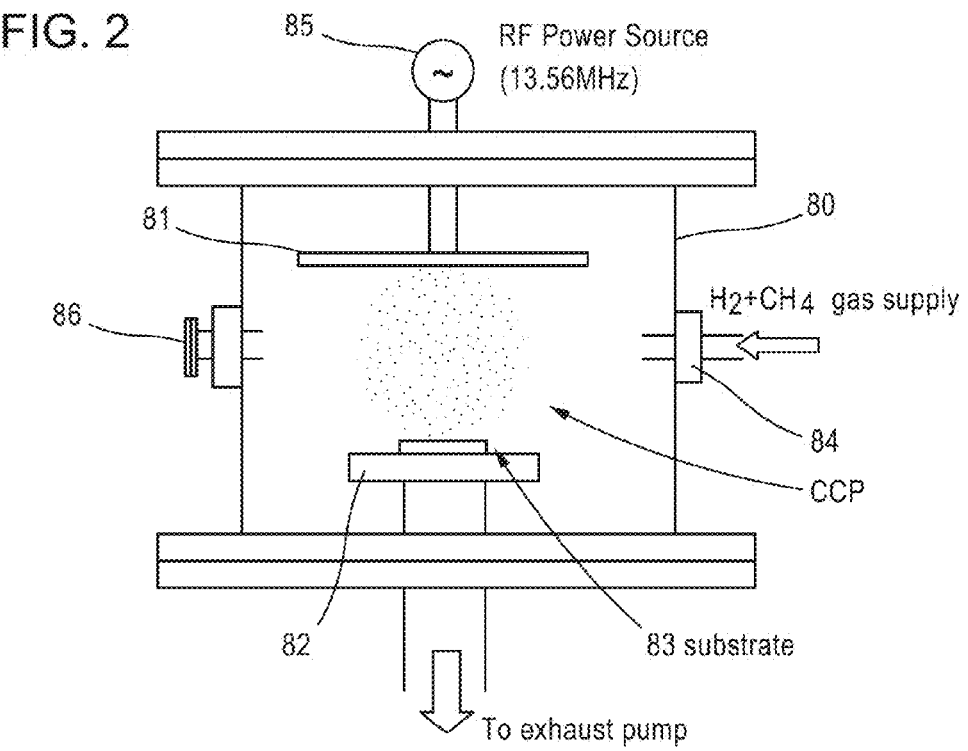
FIG. 2 is a schematic cross-sectional view showing one structure of a plasma CVD apparatus used to form a carbon nanochips layer.

In addition, the carbon nanochips can be preferably formed by a plasma CVD method using a methane-hydrogen mixed gas as a raw material. Although the specification of a plasma CVD apparatus is not particularly limited, when an apparatus having a parallel plate electrode is used, as shown in FIG. 2, the plate electrode including a first electrode 81 and a second electrode 82 is disposed in a vacuum chamber 80, and a substrate 83 is placed on the second electrode 82 parallel to the plate electrode. Subsequently, a mixed gas containing hydrogen and methane is supplied between the plate electrodes in parallel thereto from a gas inlet 84. An electrical power is input to the first electrode 81 by an RF power source 85, and an RF wave is irradiated on the mixed gas for plasmanization thereof, so that a capacity coupled plasma atmosphere (CCP) is formed among the first electrode 81, the second electrode 82, and the substrate 83. The temperature of the substrate 83 is controlled by a heater (not shown) in the second electrode 82. An observation window 86 may be provided at a side surface of the vacuum chamber 80. The plasma CVD apparatus is not limited to that described above, and for example, a mixed gas may be supplied from an upper side of a vacuum chamber as disclosed in PTLs 1 and 3.

Before the carbon nanochips layer is formed by a plasma CVD method, by an oxygen cleaning step of generating plasma in the chamber in the presence of oxygen, the inside of the chamber is preferably cleaned by oxygen cleaning. The oxygen cleaning may be performed either before or after the substrate is set in the chamber. By the oxygen cleaning, it is believed that contaminants adhered to the inside of the chamber, such as to the electrodes, is not only removed, but also the oxide film on the substrate surface is prevented from being contaminated during the formation of the carbon nanochips layer, and in addition, the metal oxide film on the substrate surface is activated by an oxygen atmosphere.

As preferable conditions for the oxygen cleaning step, oxygen is used as a flow gas, and the gas flow rate is set to 10 to 100 sccm and preferably approximately 10 to 60 sccm. The substrate temperature is set to 60° C. to 300° C., the process pressure is set to 10 to 130 Pa and preferably approximately 10 to 100 Pa, and the time is set to approximately 10 minutes to 1 hour and preferably approximately 10 to 30 minutes. In addition, the output and the frequency of an applied high-frequency wave may be set to approximately 100 to 200 W and 13.56 MHz, respectively.

In a plasma CVD method using a methane-hydrogen mixed gas as a raw material, when the substrate temperature is set to 650° C. or more under the growth conditions which will be described later, an amorphous phase is likely to be formed, and in addition, unlike a known carbon nanowall which is formed to stand perpendicularly to the substrate, a carbon nanochips layer can be easily formed in which many flaky graphene sheets are grown in various and oblique directions so as to cover the entire surface of the substrate while spaces are formed between the graphene sheets.

The plasma CVD method is a method which, in order to activate a chemical reaction, performs a chemical vapor phase growth by plasmanizing a raw material gas. The plasma CVD represents the concept including, regardless of the type of excitation method for plasma generation, high-frequency plasma CVD using a high frequency, ECR plasma CVD applying a microwave and an ECR magnetic field, induction coupled plasma (ICP) CVD, UHF plasma CVD, VHF plasma CVD, and the like.

In the present invention, preferable conditions of the plasma CVD method are as follows. As a flow gas, a mixed gas containing hydrogen and methane is used. In order to independently grow carbon nanochips from the substrate surface slantingly in random directions, the ratio of hydrogen to methane is preferably set to $H_2/CH_4 = 1/5$ to $2/1$. As this ratio is decreased, the size of crystallites is increased, and g/d is decreased. Since dependent on the apparatus, although the flow rate of the mixed gas is appropriately selected in accordance with the apparatus, in general, a flow rate of approximately 10 to 500 sccm is used as a standard rate. The substrate temperature is preferably 650° C. to 850° C. The process pressure in the chamber, the output of an applied high frequency wave, the frequency thereof, and the distance from the electrode to the substrate are set to 0.05 to 0.5 torr (6.7 to 66.7 Pa), approximately 50 to 200 W, 13.56 MHz, and approximately 20 to 30 mm, respectively, and the growth may be performed for approximately 15 minutes to 2 hours.

In order to form the carbon nanochips layer, the substrate temperature is necessarily set to 650° C. or more and preferably more than 700° C. and is set to 850° C. or less and more preferably 800° C. or less. When the substrate temperature is set to a high temperature of more than 900° C., it is not preferable since the mode of crystal growth of graphite is changed, and graphite grain growth occurs. The growth time is necessarily set to 15 minutes or more. By the heating temperature of the substrate and the time therefor, the height (growth) of the carbon nanochips layer can be controlled, and carbon nanochips having a height of approximately 100 to 200 nm can be grown for approximately 1 to 2 hours. Since the nanochip shape is unlikely to be obtained as the process pressure inside the chamber is increased, a process pressure of approximately 0.05 to 0.1 Torr (6.7 to 13.3 Pa) is more preferable.

In addition, the bias at a substrate side in the plasma CVD method is preferably set to 0 V or less in view of nanochip shape formation. Although the carbon nanochips layer is likely to be formed when the bias is 0 V or less, a bias of −100 to 0 V is preferable.

In addition, when this method is performed, by the control of the distance from the substrate to the electrode, for example, the shape of the carbon nanochips layer can be controlled. For example, when the parallel plate is used, the distance from the electrode to the substrate is most preferably 20 to 30 mm, and when the distance is 20 mm or less, the carbon nanochip is difficult to form, and a flat shape is formed. When this distance is more than 30 mm, fine grains or flat shapes are formed.

After the carbon nanochips layer of the negative electrode of the present invention functioning as a negative electrode surface is directly brought into contact with an electrolytic solution for a lithium-ion secondary cell and is then assembled with a positive electrode with a separator provided therebetween to form a lithium-ion secondary cell, when this lithium-ion secondary cell is charged, a lithium-ion secondary cell is formed in which an organic compound layer containing lithium is formed on the carbon nanochips layer. In this cell, the volume of the active material of the negative electrode is not influenced by the charge-discharge capacity, and significant reduction in size and weight of the cell can be achieved. In addition, as is a related lithium-ion secondary cell, a high potential drive at approximately 3.2 to 4.2 V can also be performed.

After the negative electrode for a lithium-ion secondary cell of the present invention is used in combination with a positive electrode formed of $LiCoO_2$ or the like, and an electrolytic solution for a lithium-ion secondary cell, such as an electrolytic solution formed of ethylene carbonate and dimethyl carbonate, is also used to form a lithium-ion secondary cell, when this lithium-ion secondary cell is charged, on the negative electrode surface, an organic compound layer containing lithium is formed from an organic compound containing lithium. Since this organic compound layer containing lithium is primarily formed of lithium and carbon derived from the electrolytic solution and is continuously grown on the negative electrode surface, the organic compound layer containing lithium is increased in its thickness and reaches the positive electrode or is continuously grown until the reaction of the electrolytic solution is finished, and as a result, a large charge capacity can be realized. Furthermore, while the organic compound layer containing lithium is decomposed during discharge, lithium ions are returned to the electrolytic solution, so that a reversible reaction occurs by charge and discharge. Hence, the charge discharge cycle characteristics are also excellent.

The features of the charge discharge reaction as described above are obtained since the formation of the organic compound layer containing lithium and the decomposition thereof are performed in the cell at a base potential. In consideration of a half cell reaction experiment, a secondary cell (full cell) reaction, and the like, it is inferred that the formation of the organic compound layer containing lithium and the decomposition thereof are performed in a range of −0.5 to −3.5 V with respect to a hydrogen standard potential, and that charge and discharge are performed at approximately the same potential as that in the case of a negative electrode using related graphite. That is, a high potential drive at approximately 3.2 to 4.2 V, which is the feature of a related lithium-ion secondary cell, can be performed.

An organic solvent and an electrolyte of the electrolytic solution, the positive electrode, the separator, the structure of a package container forming this secondary cell, the size thereof, and the like are not particular limited, and those which have been known may be used. A positive electrode collector may be formed, for example, from aluminum, nickel, or stainless steel. The positive electrode active material may include a lithium oxide, a composite oxide containing lithium and a transition metal, a lithium sulfate, an interlayer compound containing lithium, a lithium phosphate compound (such as iron lithium phosphate, manganese lithium phosphate, or iron manganese lithium phosphate), or the like. The separator may be formed of a porous film of a polyolefin, such as polypropylene (PP) or polyethylene (PE), or a ceramic porous film.

As a nonaqueous organic solvent, ethylene carbonate, propylene carbonate, dimethyl carbonate, diethyl carbonate, and ethyl methyl carbonate are preferable. In order to improve flame retardancy of the electrolytic solution, a fluoroether may also be used. The nonaqueous organic solvent may also contain an additive, such as an organic silicone compound.

As an electrolytic salt, for example, there may be mentioned lithium hexafluorophosphate ($LiPF_6$), lithium tetrafluoroborate ($LiBF_4$), lithium perchlorate ($LiClO_4$), lithium hexafluoroarsenate ($LiAsF_6$), bis(pentafluoroethane sulfonyl)imide lithium ($LiN(C_2F_5SO_2)_2$), lithium trifluoromethane sulfonate ($LiCF_3SO_3$), bis(trifluoromethane sulfonyl)imide lithium ($LiN(CF_3SO_2)_2$), lithium tris(trifluoromethane sulfonyl)methide ($LiC(CF_3SO_2)_3$), lithium chloride (LiCl), or lithium bromide (LiBr). In addition, a gel electrolyte may also be used. Furthermore, an electrolytic solution containing an ionic liquid and a lithium salt may also be used.

Hereinafter, Examples 1 to 4 in which a SUS304 stainless steel sheet was used as the iron-based metal substrate will be described. Example 1 relates to a half cell which used a negative electrode in which carbon nanochips were formed on a substrate processed with no oxygen cleaning step, Example 2 relates to a half cell which used a negative electrode in which carbon nanochips were formed on a substrate processed by an oxygen cleaning step, and Examples 3 and 4 relates to full cells which used the negative electrodes of Examples 1 and 2, respectively.

EXAMPLE 1

Substrate

A stainless steel sheet (SUS304 used in Example 1-1, SUS316 used in Example 1-2, and SUS430 used in Example 1-3) having a thickness of 1 mm was punched out to form a disc having a diameter of 16 mm, and this disc was used as the substrate.

<Formation of Carbon Nanochips Layer>

Next, after the stainless steel sheet punched out into a disc shape was placed in a chamber of a plasma CVD apparatus (see FIG. 2), plasma CVD was performed under the following conditions.

Flow gas mixed gas of hydrogen (10 percent by volume)+ methane (50 percent by volume); Mixed gas flow rate 60 sccm; Substrate temperature 750° C.; Process pressure 0.1 torr (13.3 Pa); Time 1 hour; DC bias voltage 0 V; Output of applied high frequency wave 100 W; Frequency of applied high frequency wave 13.56 MHz; Distance from electrode to substrate 25 mm.

Figure 3:
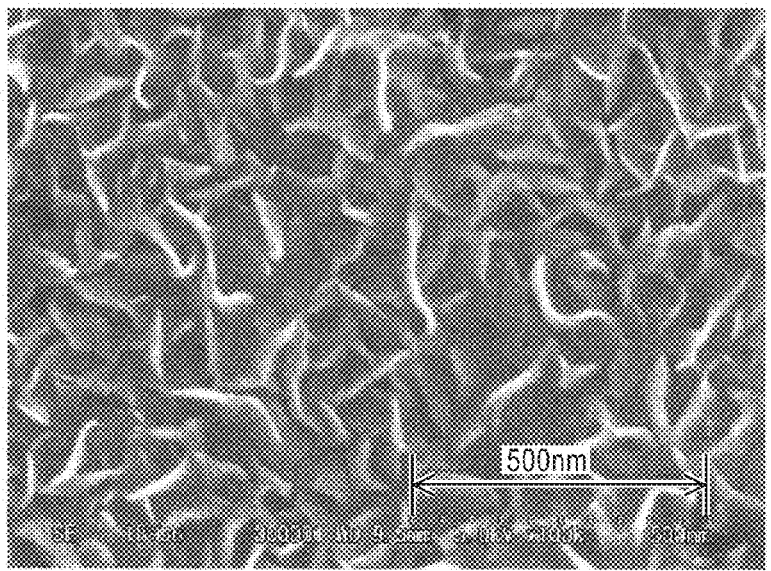
FIG. 3 is an electron microscopic photo substituted for drawing of a carbon nanochips layer grown on a SUS304 stainless steel sheet when viewed from the above of a substrate surface.
Figure 4:
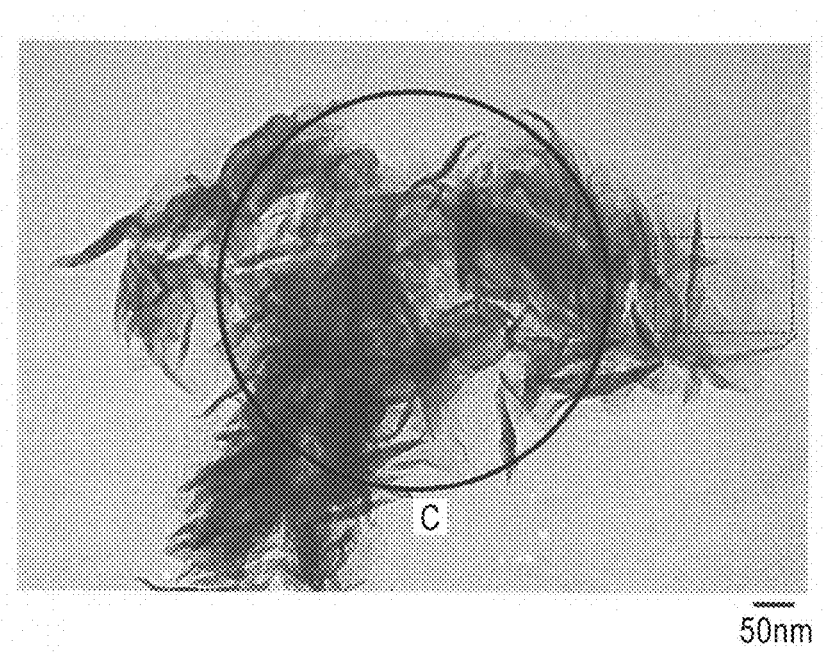
FIG. 4 is a transmission electron microscopic photo substituted for drawing of a carbon nanochips layer (TEM bright-field image, ×240,000 times).
Figure 5:
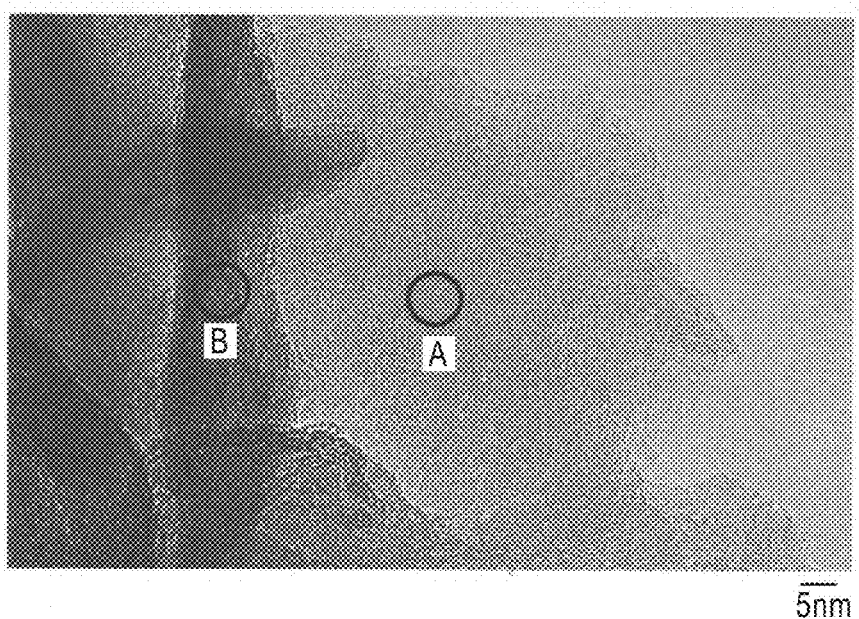
FIG. 5 is a transmission electron microscopic photo substituted for drawing of the carbon nanochips layer (portion enclosed by a dotted line at the right side of FIG. 4, ×2,000,000 times).
Figure 6:
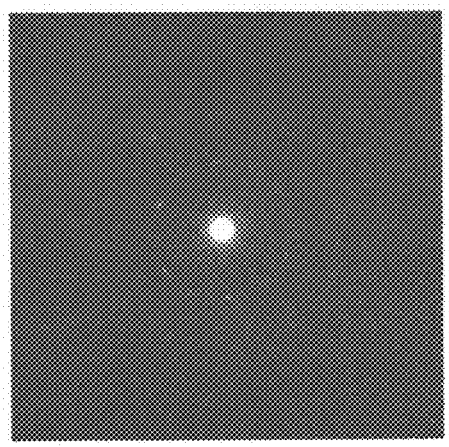
FIG. 6 shows electron beam diffraction images of the carbon nanochips layer by a transmission electron microscope (nano-beam electron diffraction images of points A and B of FIG. 5, beam diameter: approximately 5 nm; a selected-area electron diffraction image of point C of FIG. 4, selected-area diameter: approximately 600 nm, camera constant Lλ: 20.06 Å·mm).
Figure 6:
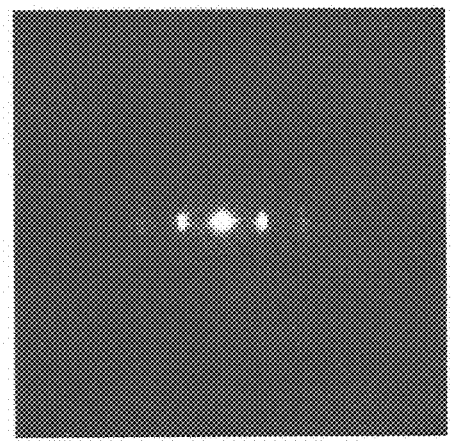
Figure 6:
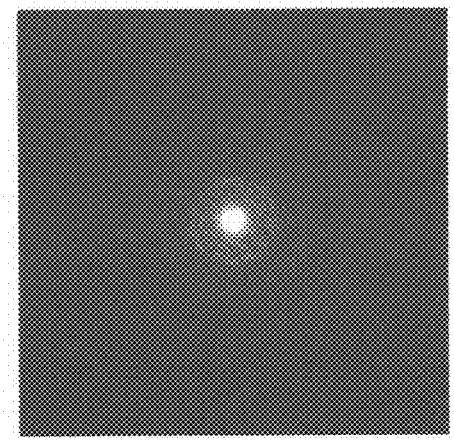

A scanning electron microscopic photo of a surface of a sample of Example 1-1 thus obtained is shown in FIG. 3. In addition, from transmission electron microscopic photos (see FIGS. 4 and 5) and electron beam diffraction photos (see FIG. 6) of the sample thus obtained, it was found that a thin film layer formed so as to cover the surface of the stainless steel sheet was a layer in which many flaky graphene sheets were grown in irregular directions and in close contact with each other and that carbon nanochips, which were flaky nanostructures, each formed an extremely small crystal.

From the electron microscopic photo of FIG. 3, it is found that although flat carbon crystals characteristic of the carbon nanowalls are observed, unlike a related carbon nanowall which has been known, the growth direction thereof is not strictly perpendicular to the substrate, the crystals are independently grown from the substrate surface slantingly in irregular directions, and the front end sides of the grown crystals are brought into contact with each other or are close to each other so as to cover the substrate surface. The height (thickness) of the carbon nanochips layer obtained by observation of the cross section of the thin film layer using an electron microscope was approximately 50 to 100 nm.

In addition, in Example 1-2 in which the substrate formed of SUS316 was used and Example 1-3 in which the substrate formed of SUS430 was used, carbon nanochips layers were formed, and the same result was also obtained as that in Example 1-1 in which the substrate formed of SUS304 was used.

COMPARATIVE EXAMPLE 1

In Comparative Example 1, by a known method (method disclosed in Japanese Unexamined Patent Application Publication No. 2008-239369), carbon nanowalls were formed on the substrate used in Example 1. That is, $CF_4$ was supplied between parallel plate electrodes in a chamber of a CVD apparatus, and while the substrate was heated at approximately 500° C., the carbon nanowalls were formed by PECVD (plasma-enhanced chemical vapor phase deposition method). The in-chamber pressure was 100 mTorr (13.3 Pa), and the growth was performed for 8 hours. The height obtained by observation of the cross section of the carbon nanowall layer using an electron microscope was approximately 1,500 nm.

<Measurement of Raman Spectrum>

Figure 7:
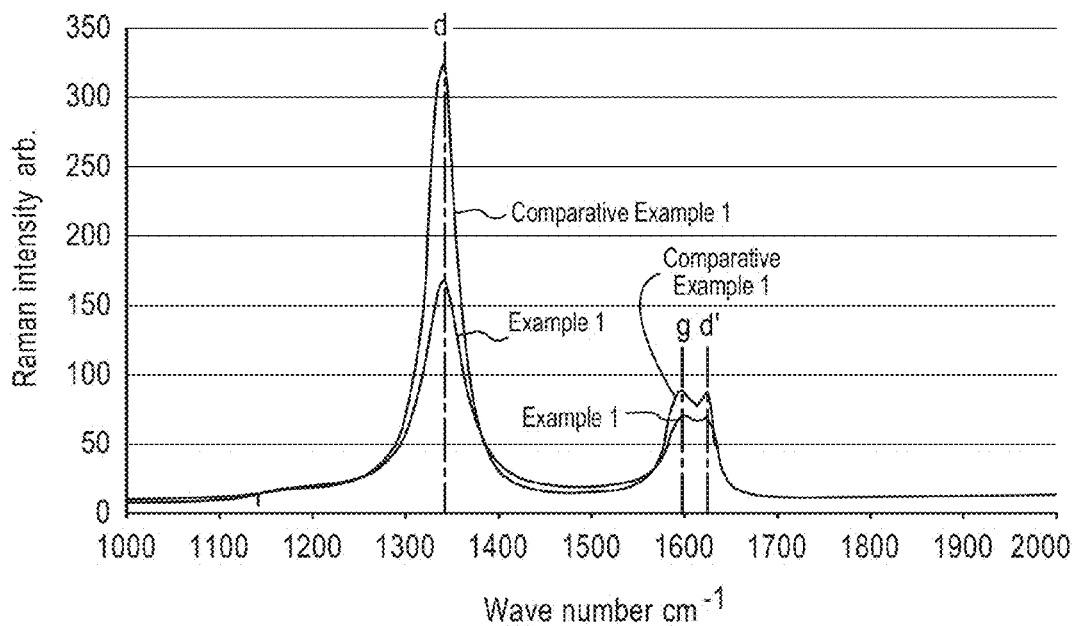
FIG. 7 shows Raman spectra of graphite of carbon nanochips layers of negative electrodes for a lithium-ion secondary cell of Example 1 and Comparative Example 1.

Raman spectra of the samples of Example 1 and Comparative Example 1 were measured by a microscopic laser Raman spectroscopic apparatus (Horiba LabRAMHR-800) using an argon laser having a wavelength of 532 nm. The results are shown in FIG. 7. From FIG. 7, g/d of Example 1 was 0.42, and g/d of Comparative Example 1 was 0.28, so that it was found that the crystallinity of graphite of Example 1 was lower than that of Comparative Example 1.

EXAMPLE 2

In Example 2, before the formation of the carbon nanochips layer by a plasma CVD in Example 1, in the state in which the substrate and the plasma CVD electrodes were set in the chamber, an oxygen cleaning step was performed under the following conditions. The other conditions were the same as those of Example 1 in which the formation of the carbon nanochips layer was performed by a plasma CVD method at a substrate temperature of 750° C., and description thereof will be omitted.

Flow gas 100% of oxygen; Gas flow rate 60 sccm; Substrate temperature controlled at 80° C. as minimum and 180° C. as maximum; Process pressure 0.8 Torr (100 Pa); Time 1 hour; Output of applied high frequency wave 100 W; Frequency of applied high frequency wave 13.56 MHz.

<Evaluation of Negative Electrode by Half Cell>

By the use of the negative electrode for a lithium-ion secondary cell formed as described above in each of Examples 1 and 2, a secondary cell (half cell) was formed using the carbon nanochips layer as a negative electrode surface and a lithium metal as a counter electrode with a polyethylene separator provided therebetween, and the charge discharge characteristics of the cell were measured. As the electrolytic solution, the ratio of ethylene carbonate to dimethyl carbonate was set to 1 to 1, lithium hexafluorophosphate ($LiPF_6$) was used as the electrolyte, and the concentration thereof was set to 1 mol/L. Evaluation of the charge discharge characteristics was performed using a constant current (CC) mode in a temperature environment of 25° C., and at a C rate of 0.1 in charge and discharge, charge was performed to a final charge voltage of 0 V, and discharge was performed to a final discharge voltage of 2.5 V.

Figure 8:
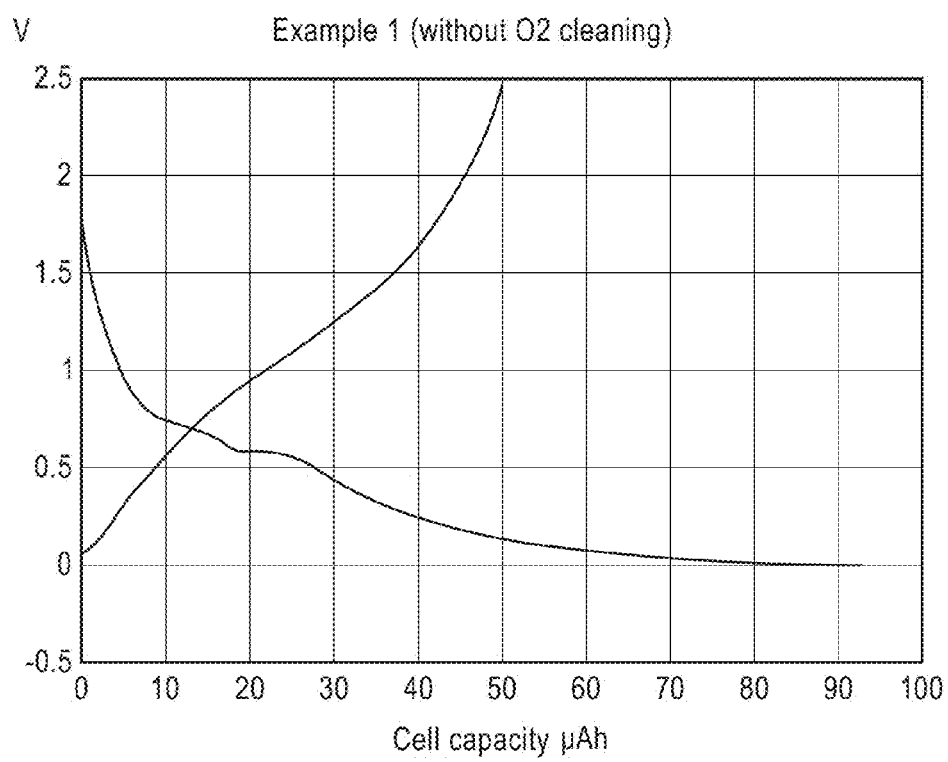
FIG. 8 is a graph showing charge discharge characteristics (half cell) of the negative electrode for a lithium-ion secondary cell of Example 1.
Figure 9:
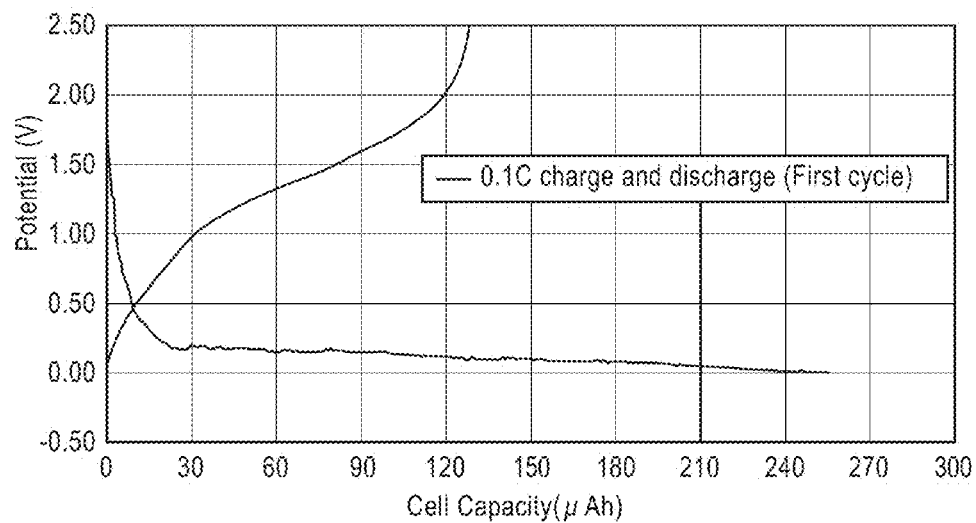
FIG. 9 is a graph showing charge discharge characteristics (half cell) of a negative electrode for a lithium-ion secondary cell of Example 2.

FIG. 8 is a graph showing the charge discharge characteristics in the case of Example 1, and FIG. 9 is a graph showing the charge discharge characteristics in the case of Example 2. In Example 1, the charge capacity was approximately 90 μAh, and the discharge capacity was approximately 50 μAh, and in Example 2, the charge capacity was approximately 255 μAh, and the discharge capacity was approximately 130 μAh. Although it is estimated that the specific gravity of the carbon nanochips is smaller than that of graphite, since the thickness of the carbon nanochip is small, such as 100 nm or less, accurate measurement of the mass and volume thereof was difficult to perform. Accordingly, when it is assumed that the specific gravity is 2.2 g/cm$^3$, which is the specific gravity of graphite, the filling rate is 100%, the electrode area is 2.0 cm$^2$, and the height of the carbon nanochips layer is 100 nm, the weight thereof is calculated to be 44.21 μg. When this weight is assumed as a deposition amount, as an assumed minimum value of the discharge capacity per unit weight obtained from the above discharge capacity, approximately 1,130 mAh/g and approximately 2,940 mAh/g were obtained in Examples 1 and 2, respectively. This discharge capacity is significantly far higher than 372 mAh/g, which is the theoretical discharge capacity calculated from the amount of lithium (one lithium atom per 6 carbon atoms) that can be intercalated between the layers of graphene sheets.

Figure 10:
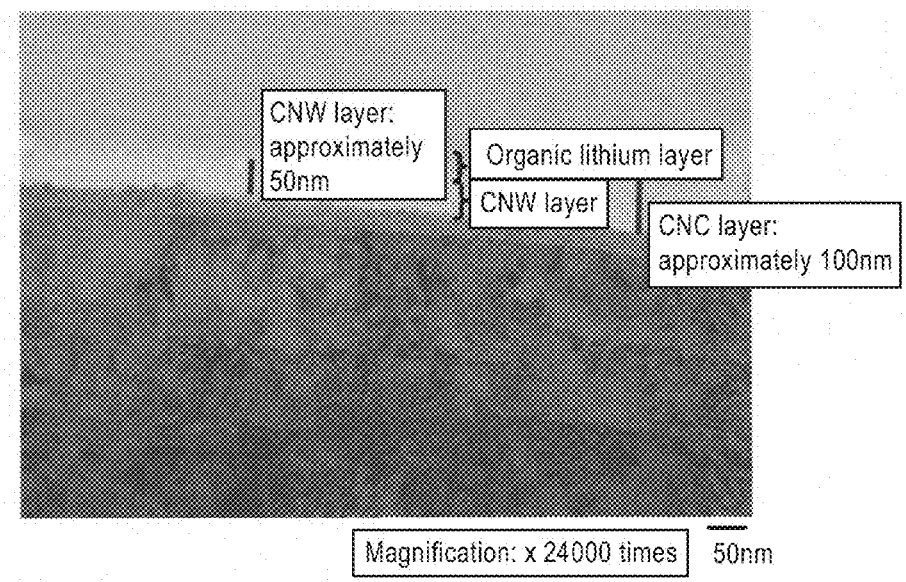
FIG. 10 is a transmission electron microscopic photo substituted for drawing of a cross section of the negative electrode for a lithium-ion secondary cell of Example 1 after charge is performed (magnification: 24,000 times).
Figure 11:
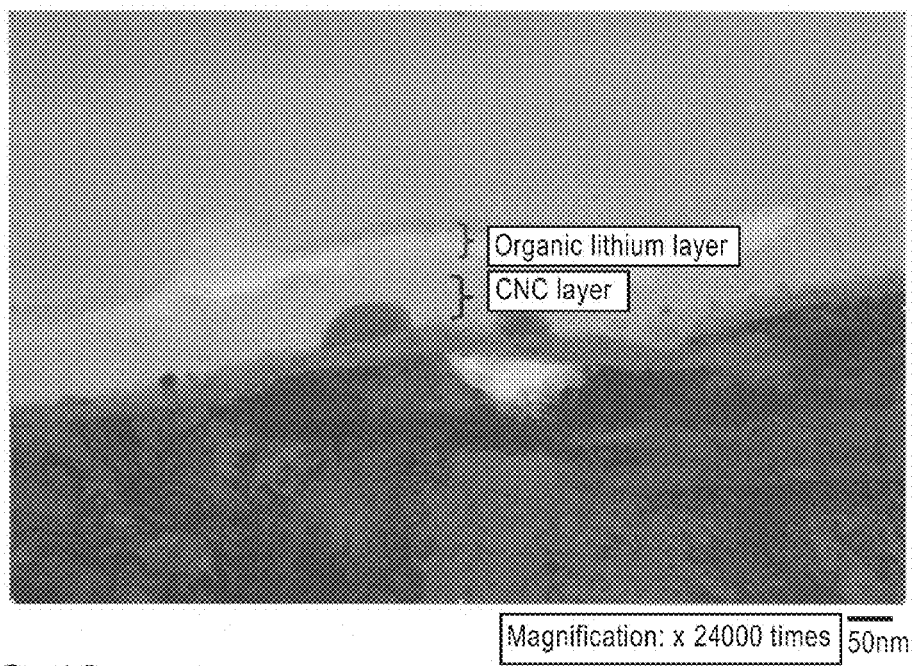
FIG. 11 is a transmission electron microscopic photo substituted for drawing of a cross section of the negative electrode for a lithium-ion secondary cell of Example 2 after charge is performed (magnification: 24,000 times).
Figure 12:
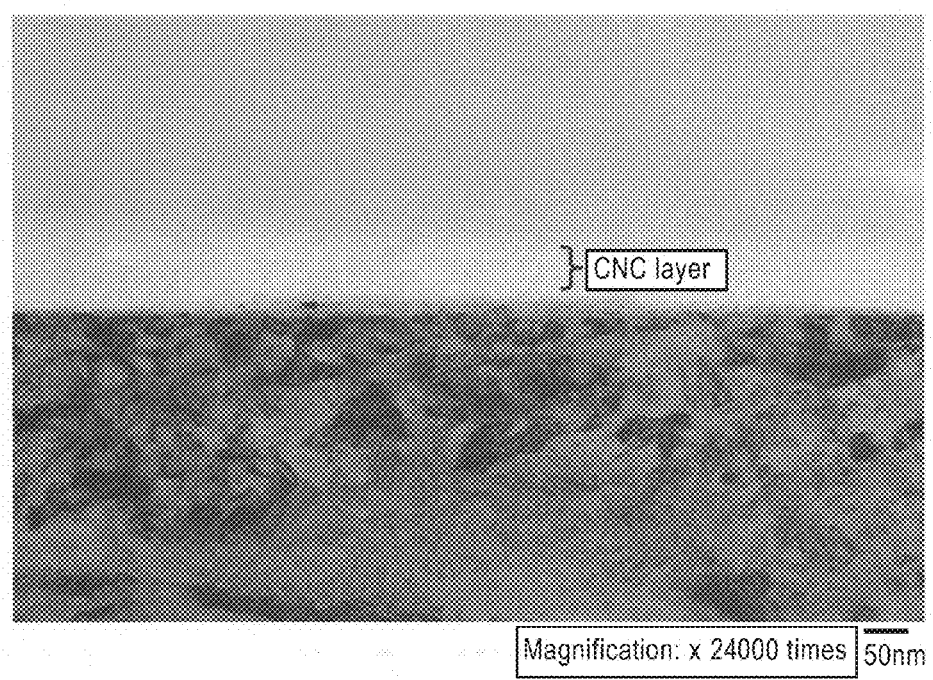
FIG. 12 is a transmission electron microscopic photo substituted for drawing of a cross section of the negative electrode for a lithium-ion secondary cell of Example 1 after discharge is performed (magnification: 24,000 times).
Figure 13:
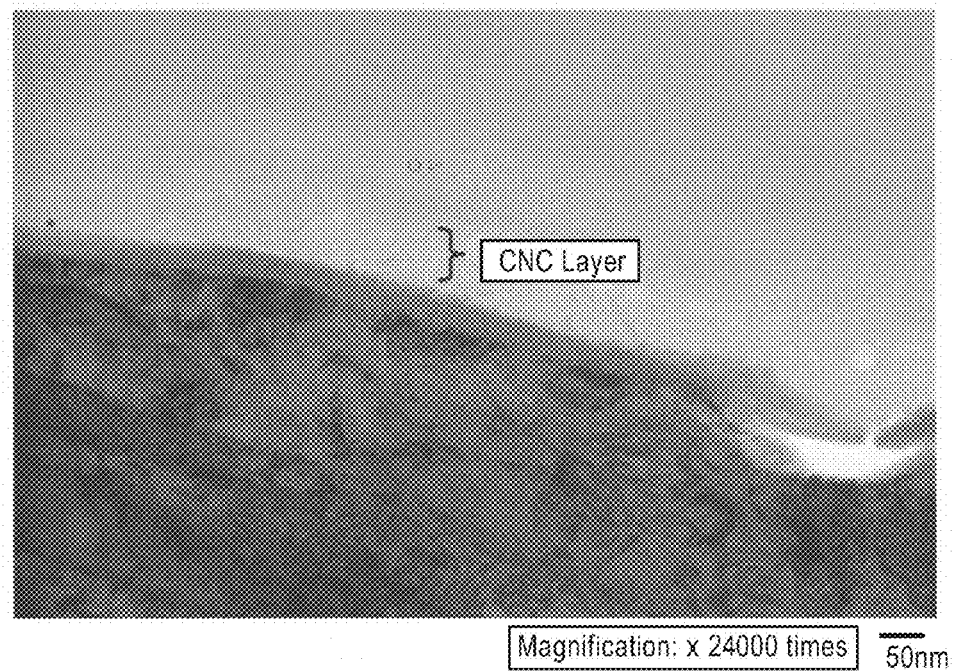
FIG. 13 is a transmission electron microscopic photo substituted for drawing of a cross section of the negative electrode for a lithium-ion secondary cell of Example 2 after discharge is performed (magnification: 24,000 times).

The reason for this surprising result is inferred as follows. That is, beside the ion occlusion between the graphite layers forming carbon nanochips and between the carbon nanochips, since the organic compound layer containing lithium which occludes lithium is formed on the carbon nanochips, the charge-discharge capacity is dramatically increased. As shown in FIGS. 10 and 11, by a transmission electron microscopic photo of a cross section of the negative electrode taken after the cell is charged, it is confirmed that as this organic compound layer containing lithium, a certain type of layer is formed. In addition, by the composition analysis using EDX, carbon, fluorine, and lithium are detected in the above layer, so that an organic compound containing lithium formed by charge is confirmed. On the other hand, in FIGS. 12 and 13, the organic compound layer is not observed at all on the surface of the negative electrode by a transmission electron microscopic photo of a cross section of the negative electrode taken after the cell is discharged, and hence it is confirmed that lithium is released. In addition, it is also found that the structure of the surface of the negative electrode is not changed.

Since the charge-discharge capacity of Example 1 was significantly different from that of Example 2, and the rising rate of charge and discharge of the negative electrode of Example 2 in which the oxygen cleaning was performed was fast as compared to that of the negative electrode of Example 1 in which the oxygen cleaning was not performed, it was found that the secondary cell of Example 2 had superior performance to that of Example 1.

EXAMPLE 3

Formation of Lithium-Ion Secondary Cell (Full Cell)

Figure 14:
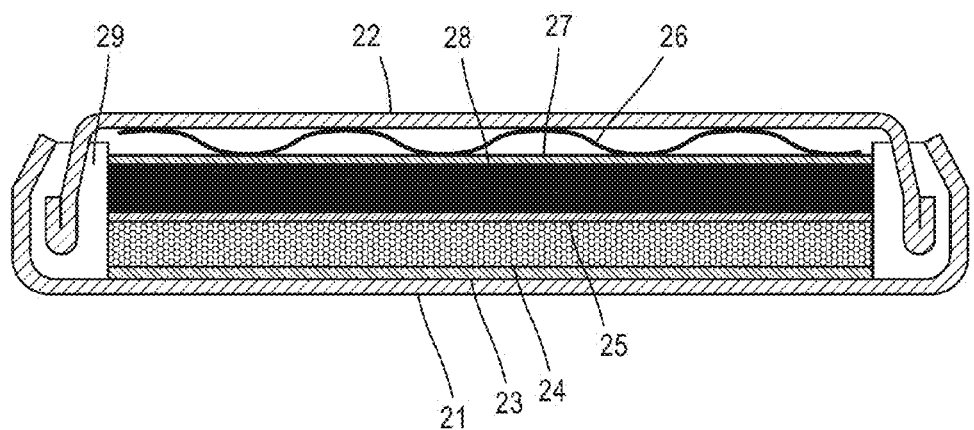
FIG. 14 is a schematic cross-sectional view of a lithium-ion secondary cell of each of Examples 3, 4, 7, 8, and 10.

By the use of the negative electrode of Example 1, a full cell (coin cell: No. 2032) was formed, and the charge-discharge capacity thereof was measured. That is, as shown in FIG. 14, a positive electrode 28 containing a positive electrode active material $Li_{1-x}CoO_2$ (x=0 to 1, layered structure, capacity: 1.6 mAh/cm$^2$) was brought into contact with a negative electrode 24 of Example 1 formed as described with a separator 25 provided therebetween, and a collector 27 using aluminum as a substrate was further brought into contact with the positive electrode 28 and was also brought into contact with a cell container 22 with a plate spring 26 provided therebetween. In addition, the negative electrode 24 was brought into contact with a cell container 21 with a collector 23 provided therebetween. In addition, as the electrolytic solution for a lithium-ion cell, a solution formed by dissolving $LiPF_6$ in a mixed liquid containing ethylene carbonate and dimethyl carbonate at a mass ratio of 50 to 50 so as to have a concentration of 1 mol/L was charge in the container.

Figure 15:
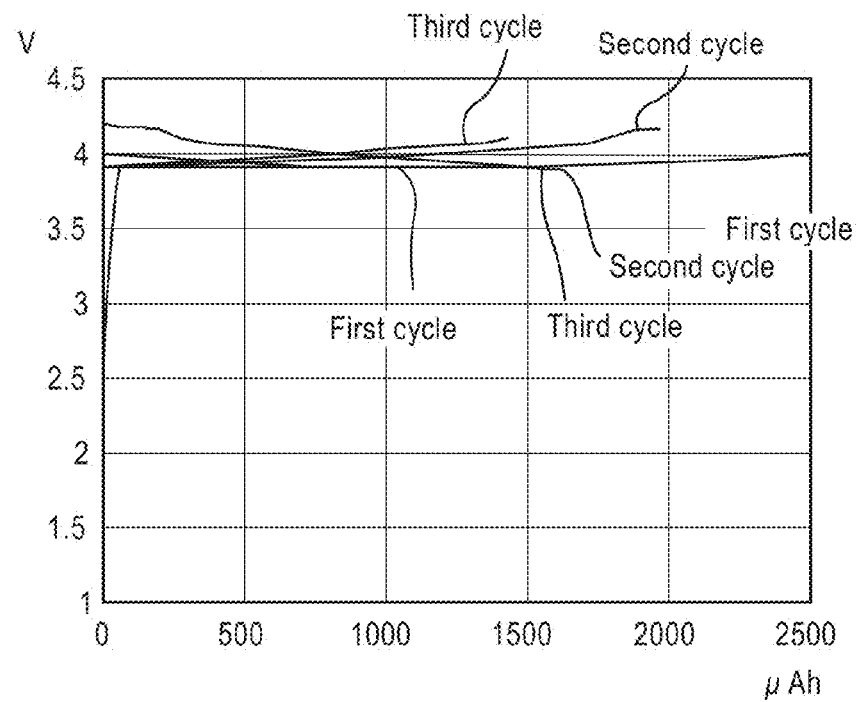
FIG. 15 is a graph showing charge discharge characteristics (full cell) of the secondary cell of Example 3.

For the evaluation of charge discharge characteristics, constant current (CC) charge and discharge were performed at a charge and discharge current of 50 μA in a temperature environment of 25° C. As a result, as shown in FIG. 15, the charge and discharge potentials were stable from 3.8 to 4.1 V, and as for the charge-discharge capacity (μAh) from a first to a third cycle, the charge capacities were 2,499, 2,267, and 1,706, and the discharge capacities were 1,222, 1,698, and 1,605, so that it was found that excellent charge discharge characteristics were obtained. The discharge capacity at the first cycle based on the deposition amount assumed as that in Examples 1 and 2 was high, such as approximately 27,640 mAh/g.

EXAMPLE 4

Figure 16:
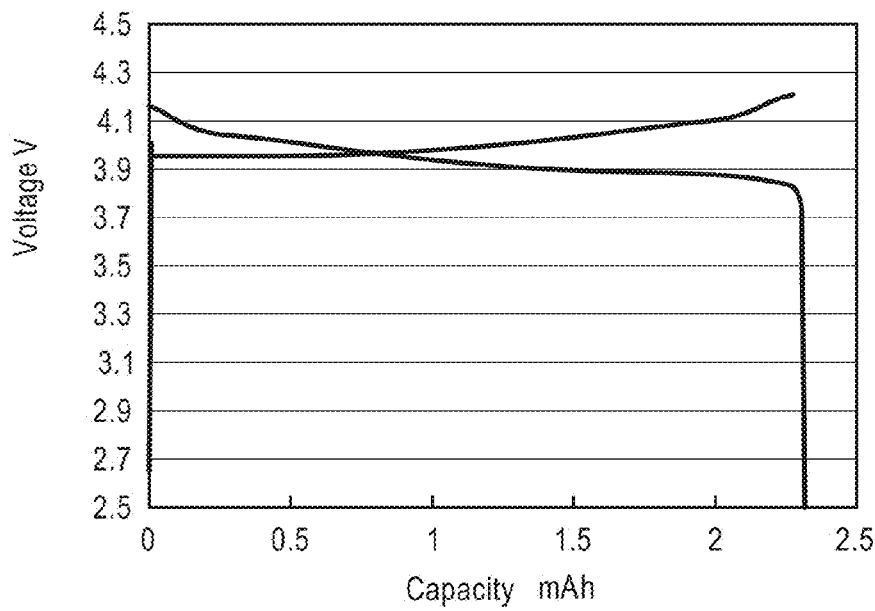
FIG. 16 is a graph showing charge discharge characteristics (full cell) of the secondary cell of Example 4.

By the use of the negative electrode of Example 2, a full cell was formed in a manner similar to that of Example 3, and the charge discharge characteristics thereof were measured. As a result, as shown in FIG. 16, the charge and discharge potentials were stable from 3.8 to 4.1 V, and as for the charge-discharge capacity (μAh) at a first cycle, the charge capacity was 2,300, and the discharge capacity was 2,200, so that it was found that excellent charge discharge characteristics were obtained. The discharge capacity at the first cycle based on the deposition amount assumed as that in Examples 1 and 2 was high, such as approximately 49,800 mAh/g.

Hereinafter, Examples 5 to 8 in which a carbon steel thin plate was used as the iron-based metal substrate will be described. Example 5 relates to a half cell using a negative electrode in which carbon nanochips were formed on a substrate processed with no oxygen cleaning step, Example 6 relates to a half cell using a negative electrode in which carbon nanochips were formed on a substrate processed with an oxygen cleaning step, and Examples 7 and 8 relate to full cells which used the negative electrodes of Examples 5 and 6, respectively.

EXAMPLE 5

Substrate

A general purpose cold rolled steel sheet (JIS SPCC) having a thickness of 1 mm was punched out to form a disc having a diameter of 16 mm, and this disc was used as the substrate.
<Formation of Carbon Nanochips Layer>
A carbon nanochips layer was formed under the same conditions as those of Example 1.

EXAMPLE 6

In Example 6, before the formation of the carbon nanochips layer in Example 5, an oxygen cleaning step was performed under the same conditions as those of Example 2.
<Evaluation of Negative Electrode by Half Cell>
By the use of the negative electrode formed as described above in each of Examples 5 and 6, a secondary cell (half cell) was formed using a lithium metal as a counter electrode, and the charge discharge characteristics were measured in a manner similar to that of Example 1.

Figure 17:
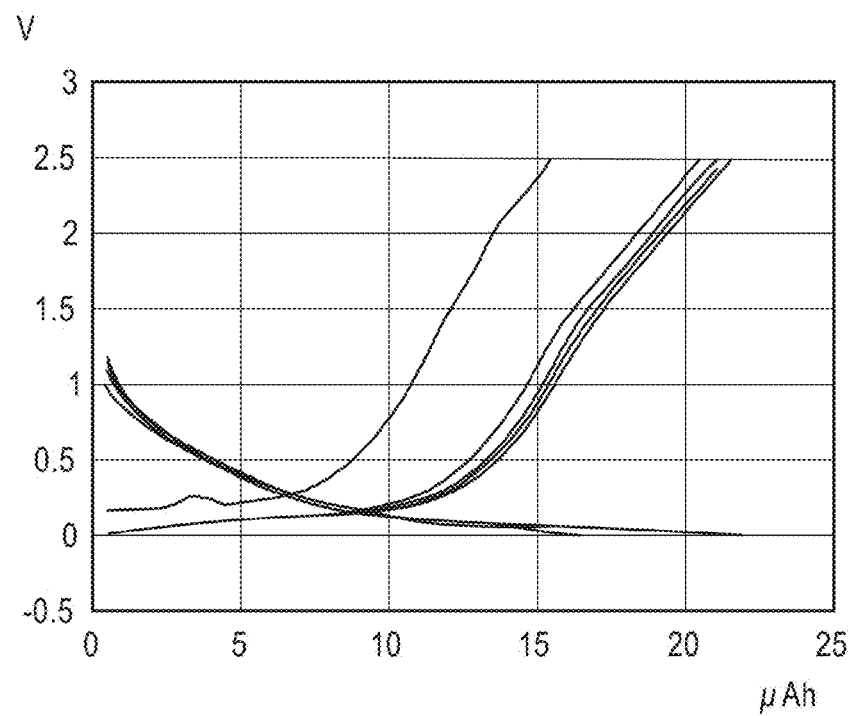
FIG. 17 is a graph showing charge discharge characteristics (half cell) of a negative electrode for a lithium-ion secondary cell of Example 5.
Figure 18:
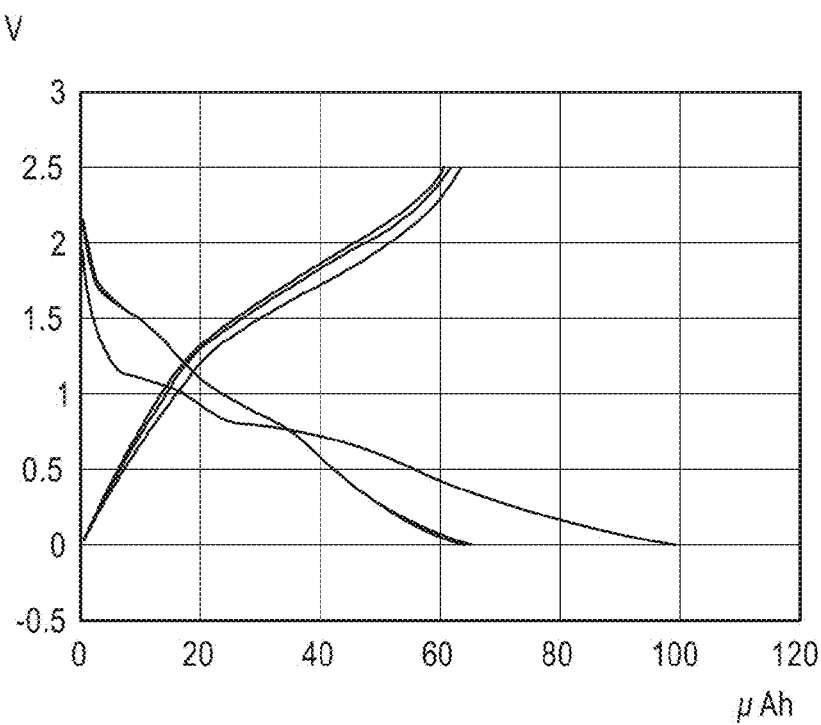
FIG. 18 is a graph showing charge discharge characteristics (half cell) of a negative electrode for a lithium-ion secondary cell of Example 6.

In FIG. 17, the charge discharge characteristics in the case of Example 5 are shown. As for the charge-discharge capacity (μAh) from a first to a fifth cycle, the charge capacities were 22, 17, 22, 22, and 23, and the discharge capacities were 21, 16, 21, 21, and 22. In FIG. 18, the charge discharge characteristics in the case of Example 6 are shown. As for the charge-discharge capacity from a first to a third cycle, the charge capacities were 100, 67, and 65, and the discharge capacities were 63, 62, and 61.

<Formation of Lithium-Ion Secondary Cell>
By the use of the negative electrode for a lithium-ion secondary cell formed as described above in each of Examples 5 and 6, a lithium-ion secondary cell of each of Examples 7 and 8 was formed.

EXAMPLE 7

Figure 19:
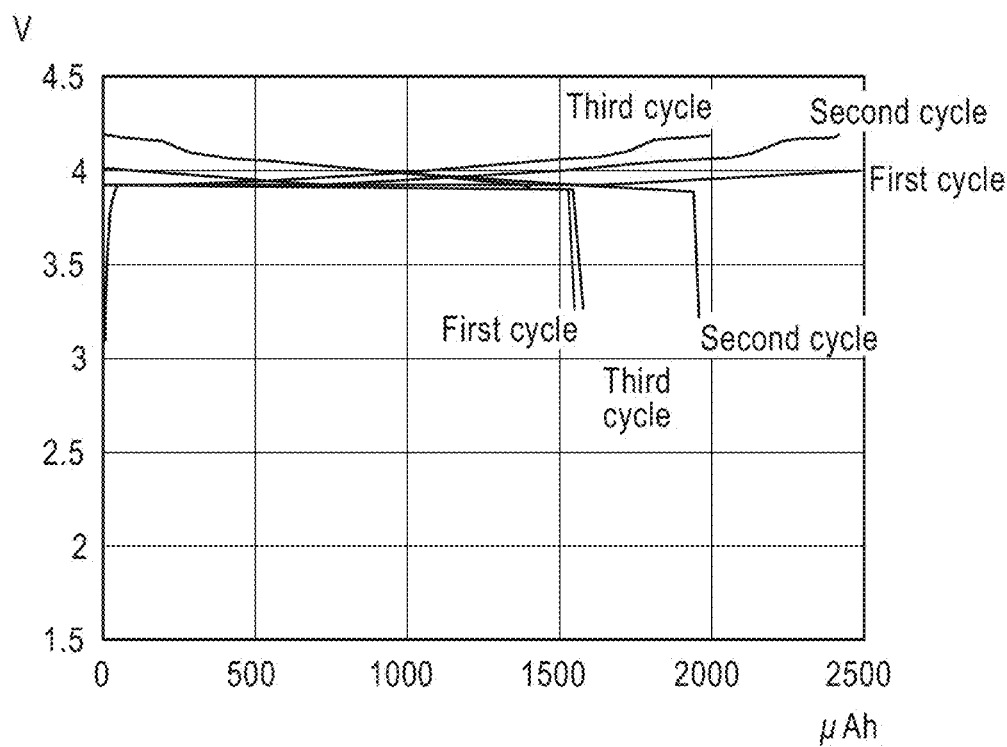
FIG. 19 is a graph showing charge discharge characteristics (full cell) of the secondary cell of Example 7.

By the use of the negative electrode of Example 5, a coin cell (full cell) was formed in a manner similar to that of Example 3, and the charge discharge characteristics were measured. As a result, as shown in FIG. 19, the charge and discharge potentials were stable from 3.8 to 4.1 V, and as for the charge-discharge capacity (μAh) from a first to a third cycle, the charge capacities were 2,499, 2,421, and 1,996, and the discharge capacities were 1,557, 1,972, and 1,580, so that it was found that excellent charge discharge characteristics were obtained. The discharge capacity at the first cycle based on the deposition amount assumed as that in Examples 1 and 2 was high, such as approximately 35,220 mAh/g.

EXAMPLE 8

Figure 20:
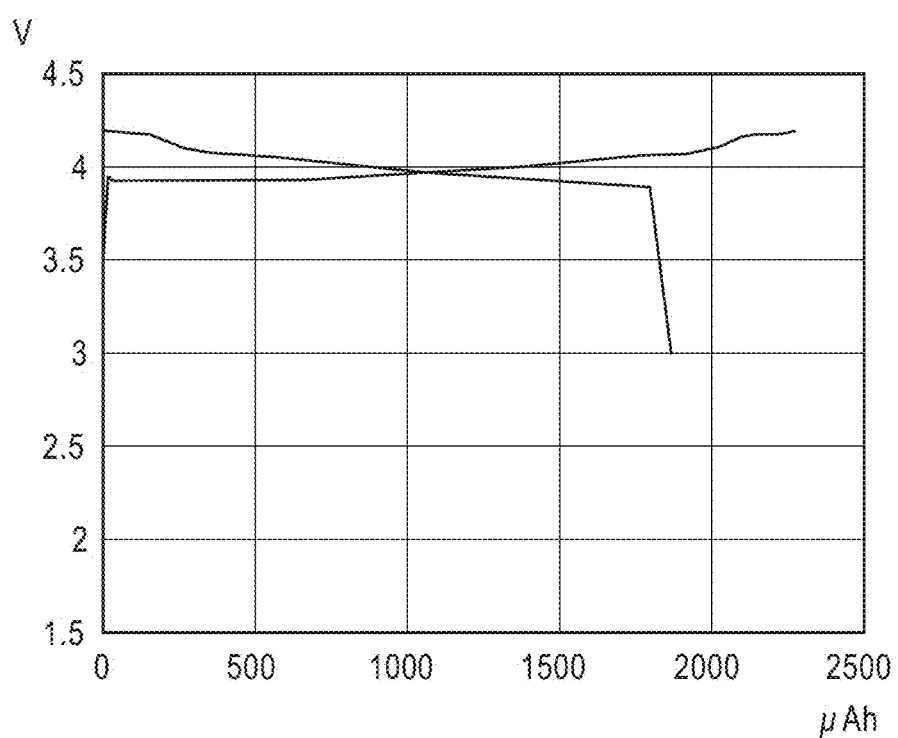
FIG. 20 is a graph showing charge discharge characteristics (full cell) of the secondary cell of Example 8.

By the use of the negative electrode of Example 6, a coin cell (full cell) was formed in a manner similar to that of Example 3, and the charge discharge characteristics were measured. As a result, as shown in FIG. 20, the charge and discharge potentials were stable from 3.8 to 4.1 V, and as for the charge-discharge capacity (μAh) at a first cycle, the charge capacity was 2,280, and the discharge capacity was 1,869, so that it was found that excellent charge discharge characteristics were obtained. The discharge capacity at the first cycle based on the deposition amount assumed as that in Examples 1 and 2 was high, such as approximately 42,280 mAh/g.

Hereinafter, Examples 9 and 10 in which pure iron foil was used as the iron-based metal substrate will be described. Example 9 relates to a half cell using a negative electrode in which carbon nanochips were formed on a substrate processed with no oxygen cleaning step, and Example 10 relates to a full cell which used the negative electrode of Example 9.

EXAMPLE 9

Substrate

Figure 21:
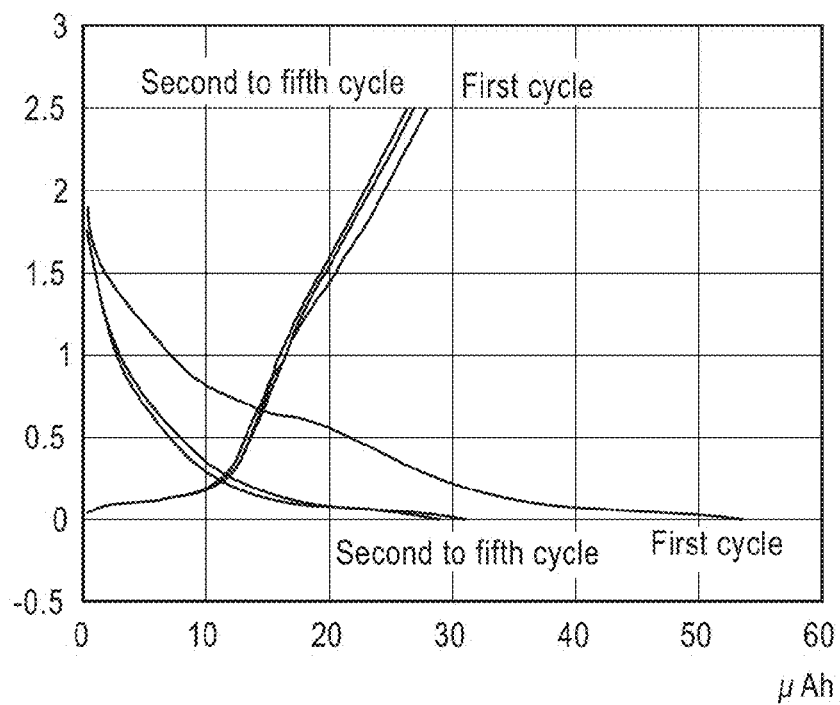
FIG. 21 is a graph showing charge discharge characteristics (half cell) of a negative electrode for a lithium-ion secondary cell of Example 9.

A pure iron plate (purity: 99.95%, manufactured by The Nilaco Corp.) having a thickness of 50 μm was punched out to form a disc having a diameter of 16 mm, and this disc was used as the substrate.
<Formation of Carbon Nanochips Layer>
A carbon nanochips layer was formed under the same conditions as those of Example 1.
<Evaluation of Negative Electrode by Half Cell>
By the use of the negative electrode formed as described above in Example 9, a secondary cell (half cell) was formed using a lithium metal as a counter electrode, and the charge discharge characteristics were measured in a manner similar to that of Example 1. In FIG. 21, the charge discharge characteristics in the case of Example 9 are shown. As for the charge-discharge capacity (μAh) from a first to a fifth cycle, the charge capacities were 54, 31, 30, 29, and 29, and the discharge capacities were 28, 27, 27, 27, and 27.

EXAMPLE 10

Figure 22:
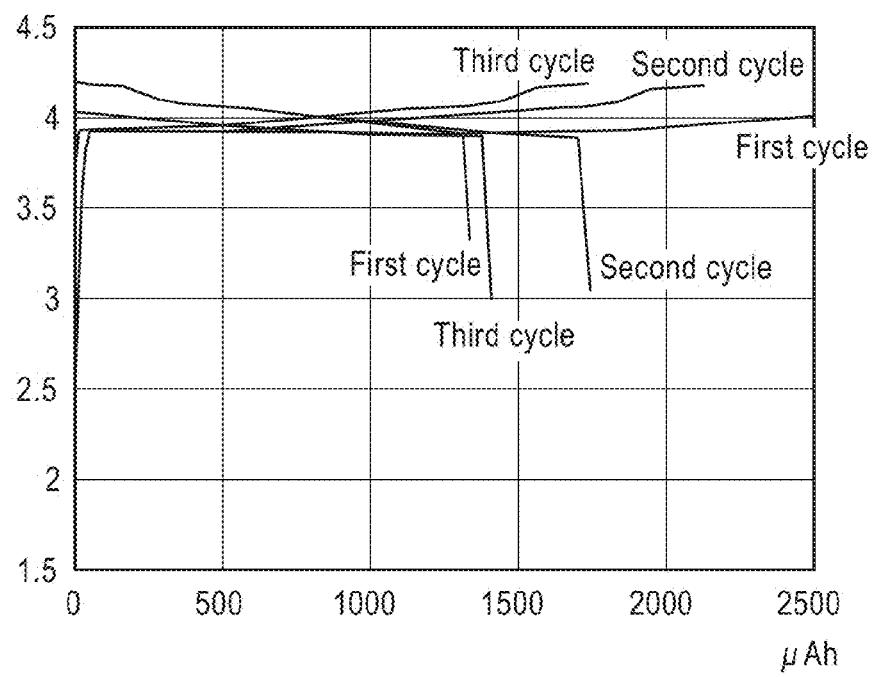
FIG. 22 is a graph showing charge discharge characteristics (full cell) of the secondary cell of Example 10.

By the use of the negative electrode of Example 9, a full cell was formed in a manner similar to that of Example 3, and the charge discharge characteristics were measured. As a result, as shown in FIG. 22, the charge and discharge potentials were stable from 3.8 to 4.1 V, and as for the charge-discharge capacity (μAh) from a first to a third cycle, the charge capacities were 2,499, 2,139, and 1,784, and the discharge capacities were 1,393, 1,734, and 1,330, so that it was found that excellent charge discharge characteristics were obtained. The discharge capacity at the first cycle based on the deposition amount assumed as that in Examples 1 and 2 was high, such as approximately 31,510 mAh/g.

The present invention is not limited at all to the above embodiments of the present invention. Various changes and modifications which can be easily conceived by a person skilled in the art may also be included in the present invention as long as without departing from the claims described therein.

INDUSTRIAL APPLICABILITY

When a lithium-ion secondary cell using the negative electrode for a lithium-ion secondary cell of the present invention is applied to a cell for an electronic apparatus, such as a mobile phone, a tablet terminal, or a personal computer, the operation time thereof can be significantly increased. In addition, when the above lithium-ion secondary cell is applied to a power source of a transport apparatus, such as an automobile, although the weight and the volume of the lithium-ion secondary cell are similar to those of a related cell, a surprisingly long drive distance can be realized. Furthermore, when applied to an electric power system, such as a smart grid, a large-scale cell formed by the present invention can be used for electric power storage of natural energy generated by solar cells and/or wind power generation and also used as measures to respond to a rapid increase in electric power demand in summer time.

REFERENCE SIGNS LIST 21, 22 cell container, 25 separator, 28 positive electrode, 24 negative electrode, 23, 27 collector, 26 plate spring, 29 gasket, 80 vacuum chamber, 81 first electrode, 82 second electrode, 83 substrate, 84 gas inlet, 85 RF power source, 86 observation window

The invention claimed is:

1. A negative electrode for a lithium-ion secondary cell, the negative electrode comprising: a substrate formed of an iron-based metal; and graphene sheets grown on the substrate to stand in directions oblique to a surface of the substrate to form a carbon layer, wherein the carbon layer is used as a negative electrode surface.

2. The negative electrode for a lithium-ion secondary cell according to claim 1, wherein the carbon layer consists of a carbon nanochips layer formed from graphene sheets grown slantingly from the surface of the substrate in various directions.

3. The negative electrode for a lithium-ion secondary cell according to claim 2, wherein the coverage of the substrate surface by the carbon nanochips layer is 100%.

4. The negative electrode for a lithium-ion secondary cell according to claim 1, wherein the iron-based metal includes pure iron, carbon steel, stainless steel, or an iron alloy.

5. The negative electrode for a lithium-ion secondary cell according to claim 1, wherein in a Raman spectrum of graphite forming the carbon nanochips layer measured using an argon laser having a wavelength of 532 nm, g/d is in a range of 0.30 to 0.80, wherein g represents the peak intensity of a g band at approximately 1,600 cm$^{-1}$ caused by in-plane hexagonal lattice vibration of carbon atoms, and d represents the peak intensity of a d band at approximately 1,360 cm$^{-1}$ which indicates a graphite defect.

6. The negative electrode for a lithium-ion secondary cell according to claim 1, wherein the carbon nanochips layer is a layer formed by a plasma CVD method using a methane-hydrogen mixed gas as a raw material.

7. A lithium-ion secondary cell assembled by directly bringing a carbon nanochips layer of the negative electrode for a lithium-ion secondary cell according to claim 1 as a negative electrode surface into contact with an electrolytic solution for a lithium-ion secondary cell.

8. A method for manufacturing the negative electrode for a lithium-ion secondary cell according to claim 1, the method comprising the steps of: setting the substrate in a chamber; and forming on the substrate a carbon nanochips layer composed of graphene sheets independently grown from a negative electrode substrate surface slantingly in irregular directions by a plasma CVD method using a mixed gas containing hydrogen and methane under the conditions in which a flow rate ratio of H$_2$/CH$_4$ is set to 1/5 to 2/1, a process pressure in the chamber is set to 6.7 to 66.7 Pa, substrate temperature is set to 650° C. to 850° C., a DC bias voltage is set to −200 to 0 V, and a growth time is set to 15 minutes to 2 hours.

9. The method for manufacturing the negative electrode for a lithium-ion secondary cell according to claim 8, further comprising, before the plasma CVD method is performed, a step of performing oxygen cleaning of the inside of the chamber by generating plasma in the chamber in the presence of oxygen.

10. The method for manufacturing the negative electrode for a lithium-ion secondary cell according to claim 9, wherein the oxygen cleaning is performed before or after the substrate is set in the chamber.

11. A lithium-ion secondary cell assembled by directly bringing a carbon nanochips layer of the negative electrode for a lithium-ion secondary cell according to claim 2 as a negative electrode surface into contact with an electrolytic solution for a lithium-ion secondary cell.

12. A lithium-ion secondary cell assembled by directly bringing a carbon nanochips layer of the negative electrode for a lithium-ion secondary cell according to claim 3 as a negative electrode surface into contact with an electrolytic solution for a lithium-ion secondary cell.

13. A lithium-ion secondary cell assembled by directly bringing a carbon nanochips layer of the negative electrode for a lithium-ion secondary cell according to claim 4 as a negative electrode surface into contact with an electrolytic solution for a lithium-ion secondary cell.

14. A lithium-ion secondary cell assembled by directly bringing a carbon nanochips layer of the negative electrode for a lithium-ion secondary cell according to claim 5 as a negative electrode surface into contact with an electrolytic solution for a lithium-ion secondary cell.

15. A lithium-ion secondary cell assembled by directly bringing a carbon nanochips layer of the negative electrode for a lithium-ion secondary cell according to claim 6 as a negative electrode surface into contact with an electrolytic solution for a lithium-ion secondary cell.

16. A method for manufacturing the negative electrode for a lithium-ion secondary cell according to claim 8, wherein the carbon layer consists of a carbon nanochips layer formed from graphene sheets grown slantingly from the surface of the substrate in various directions.

17. A method for manufacturing the negative electrode for a lithium-ion secondary cell according to claim 8, wherein the coverage of the substrate surface by the carbon nanochips layer is 100%.

18. A method for manufacturing the negative electrode for a lithium-ion secondary cell according to claim 8, wherein the iron-based metal includes pure iron, carbon steel, stainless steel, or an iron alloy.

19. A method for manufacturing the negative electrode for a lithium-ion secondary cell according to claim 8, wherein in a Raman spectrum of graphite forming the carbon nanochips layer measured using an argon laser having a wavelength of 532 nm, g/d is in a range of 0.30 to 0.80, wherein g represents the peak intensity of a g band at approximately 1,600 cm$^{-1}$ caused by in-plane hexagonal lattice vibration of carbon atoms, and d represents the peak intensity of a d band at approximately 1,360 cm$^{-1}$ which indicates a graphite defect.

20. A method for manufacturing the negative electrode for a lithium-ion secondary cell according to claim 8, wherein the carbon nanochips layer is a layer formed by a plasma CVD method using a methane-hydrogen mixed gas as a raw material.

\* \* \* \* \*